United States Patent
McDonald et al.

(10) Patent No.: US 12,382,867 B2
(45) Date of Patent: Aug. 12, 2025

(54) CROP CONSTITUENTS AND AGRICULTURAL HARVESTER CONTROL

(71) Applicant: Deere & Company, Moline, IL (US)

(72) Inventors: Brandon M. McDonald, Johnston, IA (US); Ryan F. Satchell, Cutler, IN (US); Christopher L. Roth, Ankeny, IA (US); Timothy O. Meister, Ottumwa, IA (US); Noel W. Anderson, Fargo, ND (US)

(73) Assignee: Deere & Company, Moline, IL (US)

(*) Notice: Subject to any disclaimer, the term of this patent is extended or adjusted under 35 U.S.C. 154(b) by 819 days.

(21) Appl. No.: 17/556,121

(22) Filed: Dec. 20, 2021

(65) Prior Publication Data
US 2023/0189711 A1    Jun. 22, 2023

(51) Int. Cl.
*A01D 43/08* (2006.01)
*A01D 47/00* (2006.01)

(52) U.S. Cl.
CPC ......... *A01D 43/085* (2013.01); *A01D 43/081* (2013.01); *A01D 47/00* (2013.01)

(58) Field of Classification Search
CPC .... A01D 43/085; A01D 43/081; A01D 47/00; A01D 41/141; A01D 41/06; A01B 79/005
See application file for complete search history.

(56) References Cited

U.S. PATENT DOCUMENTS

| | | | | |
|---|---|---|---|---|
| 5,961,573 A * | 10/1999 | Hale | ................... | A01B 79/005 701/470 |
| 5,978,723 A * | 11/1999 | Hale | ................... | A01B 79/005 701/50 |
| 7,540,129 B2 * | 6/2009 | Kormann | .......... | A01D 41/1277 460/1 |
| 9,894,836 B2 * | 2/2018 | Garton | ................ | A01D 41/127 |
| 10,674,663 B2 * | 6/2020 | Kirchbeck | .......... | G01N 21/359 |
| 2016/0345485 A1 * | 12/2016 | Acheson | .............. | A01B 79/005 |
| 2017/0083035 A1 * | 3/2017 | French, Jr. | .......... | A01D 41/127 |
| 2018/0242523 A1 * | 8/2018 | Kirchbeck | .......... | A01C 21/005 |
| 2019/0327889 A1 * | 10/2019 | Borgstadt | ............ | A01D 41/127 |
| 2020/0113126 A1 * | 4/2020 | Eising | ................. | A01C 21/007 |

FOREIGN PATENT DOCUMENTS

EP    3872450 A1    9/2021

OTHER PUBLICATIONS

Dairy Global, "The Effect of Maize Cutting Height on Cows" Dec. 1, 2016, 4 pages.

(Continued)

*Primary Examiner* — Abigail A Risic
(74) *Attorney, Agent, or Firm* — Kelly, Holt & Christenson, PLLC; Joseph R. Kelly

(57) ABSTRACT

A mobile agricultural machine includes a header configured to engage crop at a worksite and a controllable header actuator configured to drive movement of the header relative to a surface of the worksite. The mobile agricultural machine further includes a crop constituent sensor system configured to sense the crop and generate a crop constituent sensor signal indicative of a value of a constituent of the crop. The mobile agricultural machine further includes a control system configured to generate a control signal to control the mobile agricultural machine based on the detected value of the constituent of the crop.

14 Claims, 16 Drawing Sheets

(56) References Cited

OTHER PUBLICATIONS

South Dakota State University: Open PRAIRIE: Open Public Research Access Institutional Repository and Information Exchange. Nitrogen Distribution in the Corn Plant. 1948, 42 pages.
Farmwest.com, Chapter 8: Quality of Corn Silage, 2004, 55 pages.
Extended European Search Report and Written Opinion issued in European Patent Application No. 22198182.2, dated May 11, 2023, in 08 pages.

* cited by examiner

CROP CONSTITUENTS AND AGRICULTURAL HARVESTER CONTROL

FIELD OF THE DESCRIPTION

The present description relates to a mobile agricultural machine. More specifically, the present description relates to controlling an agricultural harvesting machine, such as a forage harvester.

BACKGROUND

There are many different types of mobile agricultural machines. One such mobile agricultural machine is an agricultural harvesting machine, such as a forage harvester.

A forage harvester is often used to harvest crops, such as corn, that is processed into corn silage. In performing this type of processing, the forage harvester includes a header that severs the corn stalks and a cutter that cuts the plants into relatively small pieces. A kernel processing unit includes two rollers that are positioned with a gap between them that receives the cut crop. The gap is sized so that, as the cut crop travels between the kernel processing rollers, they crush the kernels into smaller pieces or fragments.

The discussion above is merely provided for general background information and is not intended to be used as an aid in determining the scope of the claimed subject matter.

SUMMARY

A mobile agricultural machine includes a header configured to engage crop at a worksite and a controllable header actuator configured to drive movement of the header relative to a surface of the worksite. The mobile agricultural machine further includes a crop constituent sensor system configured to sense the crop and generate a crop constituent sensor signal indicative of a value of a constituent of the crop. The mobile agricultural machine further includes a control system configured to generate a control signal to control the mobile agricultural machine based on the detected value of the constituent of the crop.

Example 1 is a mobile agricultural machine comprising:
a header configured to engage crop at a worksite;
a controllable header actuator configured to drive movement of the header relative to a surface of the worksite;
a crop constituent sensor system configured to sense the crop and generate a crop constituent sensor signal indicative of a value of a constituent of the crop; and
a control system configured to generate a control signal to control the mobile agricultural machine based on the detected value of the constituent of the crop.

Example 2 is the mobile agricultural machine of any or all previous examples, wherein the control system generates the control signal to control the header actuator to drive movement of the header relative to the surface of the worksite.

Example 3 is the mobile agricultural machine of any or all previous examples, wherein the control system is further configured to:
generate the control signal based on the detected value of the constituent of the crop and a target crop constituent value.

Example 4 is the mobile agricultural machine of any or all previous examples, wherein the control system is further configured to:
generate the control signal based on the detected value of the constituent of the crop, the target crop constituent value, and a header position limit.

Example 5 is the mobile agricultural machine of any or all previous examples, wherein the control system is further configured to:
identify a direction in which to drive movement of the header based on the detected value of the constituent of the crop and the target crop constituent value; and
generate the control signal to control the header actuator to drive movement of the header in the identified direction within a header position threshold range.

Example 6 is the mobile agricultural machine of any or all previous examples, wherein the constituent sensor signal is indicative of a starch value of the crop and wherein the control system is configured to:
determine that the detected starch value satisfies a target starch value;
determine that a current height of the header is above a minimum header height threshold and;
generate the control signal to control the header actuator to lower the header relative to the surface of the worksite to a height at or above the minimum header height threshold.

Example 7 is the mobile agricultural machine of any or all previous examples, wherein the constituent sensor signal is indicative of a starch value of the crop and wherein the control system is configured to:
determine that the detected starch value is below a target starch value;
determine that a current height of the header is below a maximum header height threshold; and
generate the control signal to control the header actuator to raise the header relative to the surface of the worksite to a height at or below the maximum header height threshold.

Example 8 is the mobile agricultural machine of any or all previous examples, wherein the constituent sensor signal is indicative of a starch value of the crop and wherein the control system is configured to:
compare the detected starch value of the crop to a target starch value and, based on the comparison, generate the control signal to control the header actuator to drive movement of the header relative to the surface of the worksite.

Example 9 is the mobile agricultural machine of any or all previous examples, wherein the crop is corn silage, wherein the constituent sensor signal is indicative of a starch value of the corn silage, and wherein the control system is configured to:
determine that the detected starch value is below a target starch value and generate the control signal to control the header actuator to raise the header relative to the surface of the worksite.

Example 10 is a method of controlling a mobile agricultural machine comprising:
detecting crop material harvested by the mobile agricultural machine;
generating a crop constituent signal indicative of a value of a constituent of the detected crop material;
identifying the value of the constituent of the crop material based on the crop constituent sensor signal; and
generating a control signal to control the mobile agricultural machine based on the identified value of the constituent of the crop material.

Example 11 is the method of any or all previous examples, wherein generating the control signal to control the mobile agricultural machine based on the identified value of the constituent of the crop material comprises:
generating the control signal to drive movement of a header of the mobile agricultural machine based on the identified value of the constituent of the crop material.

Example 12 is the method of any or all previous examples and further comprising:
comparing the identified value of the constituent of the crop material to a target constituent value; and
generating the control signal to drive movement of a header of the mobile agricultural machine based on the comparison.

Example 13 is the method of any or all previous examples, wherein generating the control signal to drive movement of the header of the mobile agricultural machine comprises:
generating the control signal to drive movement of the header of the mobile agricultural machine within a header position limit.

Example 14 is the method of any or all previous examples, wherein identifying the crop constituent level of the crop material based on the crop constituent sensor signal comprises:
identifying a starch value of the crop material based on the crop constituent sensor signal.

Example 15 is the method of any or all previous examples and further comprising:
determining that the identified starch value of the crop material satisfies a target starch value;
determining that a current height of a header of the mobile agricultural machine is above a minimum header height threshold; and
generating the control signal to lower the header of the mobile agricultural to a height at or above the minimum header height threshold.

Example 16 is the method of any or all previous examples and further comprising:
determining that the identified starch value of the crop material is less than a target starch value;
determining that a current height of a header of the mobile agricultural machine is below a maximum header height threshold; and
generating the control signal to raise the header of the mobile agricultural machine to a height at or below the maximum header height threshold.

Example 17 is the method of any or all previous examples and further comprising:
determining that the identified starch value of the crop material is less than a target starch value; and
generating the control signal to raise a header of the mobile agricultural machine relative to a surface of a worksite at which the mobile agricultural machine is operating.

Example 18 is the method of any or all previous examples and further comprising:
determining that the identified starch value of the crop material satisfies a target starch value; and
generating the control signal to lower a header of the mobile agricultural machine relative to a surface of a worksite at which the mobile agricultural machine is operating.

Example 19 is a self-propelled agricultural harvesting machine, comprising:
a power source;
a frame;
a set of ground engaging elements configured to driven by the power source to propel the agricultural harvesting machine over a surface of a worksite;
a header, movably coupled to the frame, configured to engage crop and cut the crop for processing by the agricultural harvesting machine;
a header position actuator configured to drive movement of the header to different positions relative to the surface of the worksite;
a crop constituent sensor system configured to sense the processed crop and generate a sensor signal indicative of a value of a constituent of the processed crop;
a control system configured to:
identify the value of the constituent of the processed crop based on the sensor signal;
compare the identified value of the constituent of the crop to a target constituent value; and
generate a control signal to cause actuation of the header position actuator to drive movement of the header relative to the surface of the worksite based on the comparison.

Example 20 is the self-propelled agricultural harvesting machine of any or all previous examples, wherein the control system generates the control signal to cause actuation of the header position actuator to drive movement of the header relative to the surface of the worksite to a height within a header height limit based on the comparison.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
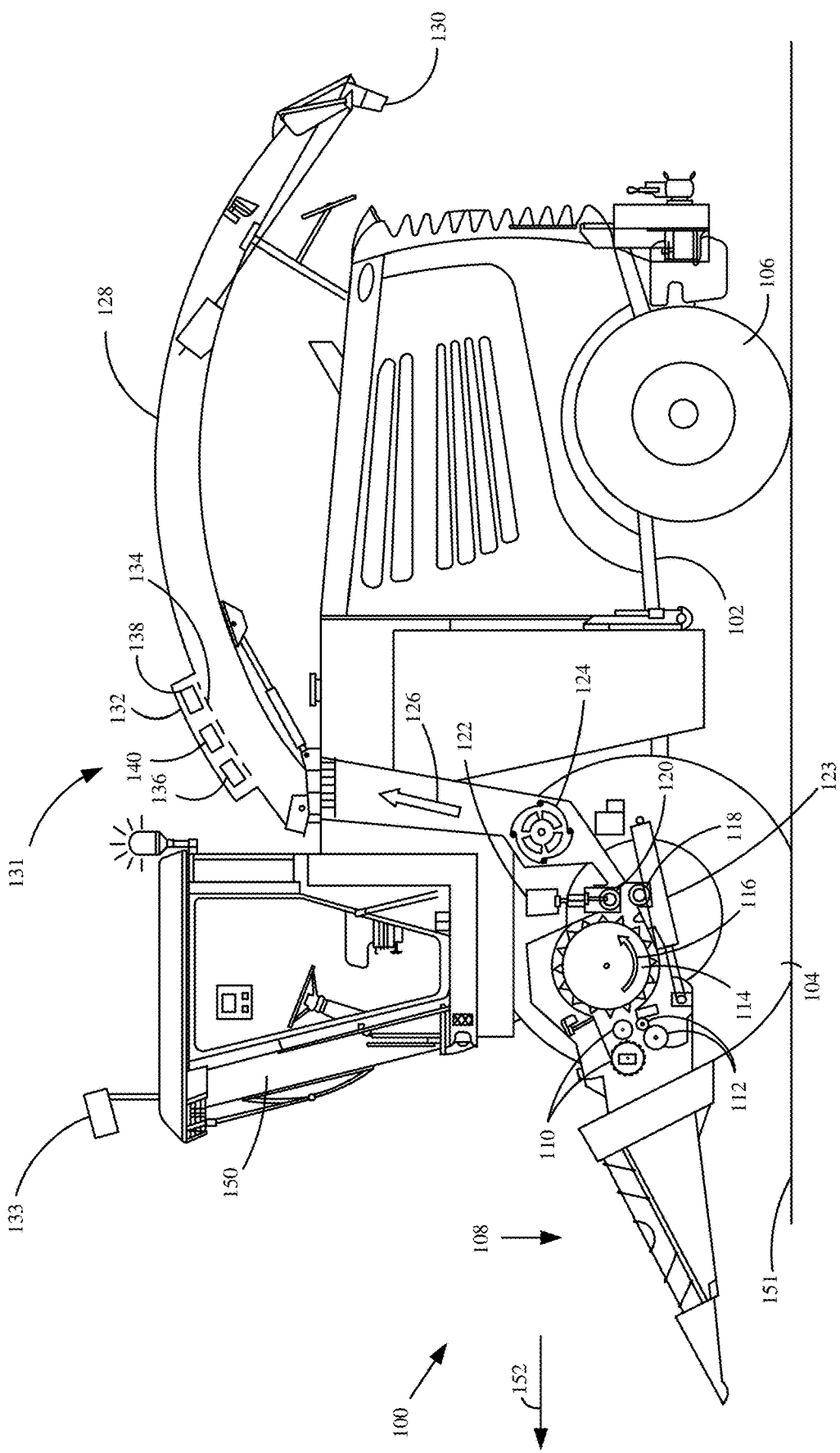
FIG. 1 is a partial pictorial, partial schematic view of one example forage harvester.

Many agricultural operations harvest crops, such as corn, to produce crop silage, such as corn silage, to provide feed for livestock. For example, dairy operations use crop silage, such as corn silage, as feed for dairy cows. Crop plants comprise various constituents, such as starch, carbohydrates, oil, protein, sugar, fiber, such as lignan, etc., at various concentrations. Additionally, the distribution of each constituent varies along the length of the crop plant, for example, starch in corn increases in concentration moving up from the base of the corn stalk, thus, corn silage resulting from corn plants cut higher along the stalk will generally have a higher concentration of starch than corn silage resulting from corn plants cut relatively lower along the stalk. Other constituents also vary along the length of the crop plant, for instance, fiber, such as lignan, tends to increase in concentration moving towards the base of the corn stalk, thus, corn silage resulting from corn plants cut lower along the stalk will generally have a higher concentration of fiber, such as lignan, as compared to corn silage resulting from corn plants cut relatively higher along the stalk. Depending on the agricultural operation, different concentrations of different constituents may be desired. Dairy farmers, for example, often desire silage with a higher starch content to aid in the production of milk. In addition to desiring certain concentrations of constituents, agricultural operations also desire a certain tonnage of silage in order to adequately feed their livestock. In the above example, while it may be prudent to cut the corn plant at a greater height along the stalk to increase starch concentration, doing so may result in inadequate resultant tonnage. Both inadequate tonnage and inadequate constituent concentrations can lead to a need for providing supplemental nutrition, which can increase costs of the agricultural operation.

In current systems, forage harvester operators position the header to engage and cut the crop at a certain height along the stalk. The severed crop portion is processed by the forage harvester while the remaining crop portion is left on the worksite as a crop stalk or residue. The concentration of constituents within the resulting silage as well as the resultant yield (e.g., tonnage) will depend on the height at which the crop is cut.

Examples disclosed herein describe a system which provides control of a forage harvester based on crop constituent values, tonnage values, or both. The system can include a sensor system for detecting the value of one or more constituents of the crop and providing sensor outputs indicative of the detected values as well as for detecting yield (e.g., tonnage) values of the crop and providing sensor outputs indicative of the yield, as well as for detecting header heights (e.g., cut heights) and providing sensor outputs indicative of the header height. The agricultural harvester can be controlled based on the detected constituent values, detected tonnage values, detected header heights, or a combination thereof, as well as, in some examples, one or more targets, such as target crop constituent values, target tonnage values, and/or target header position/cut height, etc.

Further, in some examples, a map of the worksite (e.g., field), having predictive crop constituent values and tonnage values at a plurality of elevation zones (e.g., cut heights) at different geographic location in the field is generated. In one example, the predictive crop constituent distribution map is generated by obtaining one or more maps of the worksite, such as a predictive crop constituent map, a predictive biomass map, or both. The obtained maps contain agricultural characteristic values at different geographic locations in the worksite. Further, in-situ data, such as in-situ sensor data indicative of crop constituent values, crop height values, crop moisture values, crop biomass values, and header height values, is obtained. A model generator generates a model that models a relationship between the in-situ values and the values in the obtained maps. The model is provided to a map generator which generates the predictive crop distribution map which includes predictive crop constituent values and tonnage values at multiple elevations zones (e.g., cut heights) at different geographic locations based on the model and based on the value(s) in the obtained map(s) at those different geographic locations. The agricultural harvester can be controlled based on the predictive crop constituent distribution map, as well as, in some examples, various targets, such as target crop constituent values, target tonnage, target header position/cut height, various other criteria, or a combination thereof, etc.

In some examples, as the agricultural harvester continues to operate at the worksite, additional in-situ sensor data is obtained. Based on the additional in-situ sensor data, the predictive model can be updated (e.g., remodeled) and the predictive crop constituent distribution map can also be updated (e.g., remade) based on the updated model. The agricultural harvester can be controlled based on the values within the updated predictive crop constituent map, as well as, in some examples, various targets, such as target crop constituent values, target tonnage, target header positions/cut height, or a combination thereof, etc.

While examples described herein proceed with respect to corn plants and corn silage production, it will be appreciated by those skilled in the art that the methods and systems described herein can also be applicable to various other types of crop plants and crop plant harvesting operations. For example, grasses such as sugar cane and sorghum also have constituent distributions that vary along the length of the plant, the concentration of fiber and sugar, for example, can impact the efficiency in extracting sugar or conversion to biofuels. Additionally, constituent distribution in alfalfa plants also varies along the length of the plant. Alfalfa typically has a higher concentration of fiber and have fewer quality leaves at lower portions of the plant, and thus cutting alfalfa at a lower height can impact the nutritional value relative to various agricultural operations, such as a dairy operation. These are just some examples of the different crop plants and crop plant harvesting operations to which the methods and systems described herein are applicable.

FIG. 1 is a partial pictorial, partial sectional view of a mobile agricultural harvesting machine 100. In the example of FIG. 1, mobile agricultural harvesting machine 100 is a forage harvester 100. Forage harvester 100 illustratively includes a mainframe 102 that is supported by ground engaging elements, such as front wheels 104 and rear wheels 106. The wheels 104, 106 can be driven by an engine (or other power source) through a transmission. They can be driven by individual motors (such as individual hydraulic motors) or in other ways. While wheels are illustratively shown, various other types of ground engaging elements are also contemplated, such as tracks.

FIG. 1 shows that, in the example illustrated, forage harvester 100 includes operator compartment 150. Operator compartment 150 has a plurality of different operator interface mechanisms that can include such things as pedals, a steering wheel, user interface display devices, touch sensitive display screens, a microphone and speech recognition components, speech synthesis components, joysticks, levers, buttons, as well as a wide variety of other mechanical, optical, haptic, or audio interface mechanisms. During operation, the machine moves across worksite 151 in the direction generally indicated by arrow 152.

A header 108 is mounted on the forward part of forage harvester 100 and includes a cutter that cuts or severs the crop being harvested, as it is engaged by header 108. The header 108 is positioned at a height above the surface of the worksite 151 (e.g., field) by one or more actuators 123 to engage the crop being harvested. When cut, a crop stalk of a certain height remains on the field while the severed portion of the crop is passed to upper and lower feed rolls 110 and 112, respectively, which move the harvested material to chopper 114. In the example shown in FIG. 1, chopper 114 is a rotatable drum with a set of knives mounted on its periphery, which rotates generally in the direction indicated by arrow 116. Chopper 114 chops the harvested material received through rollers 110-112, into pieces, and feeds it to a kernel processing unit which includes kernel processing rollers 118 and 120. The kernel processing rollers 118 and 120 are separated by a gap and are driven by one or more different motors (which can drive the rollers at different rotational speeds. Therefore, as the chopped, harvested material is fed between rollers 118 and 120, the rollers crush and grind the material (including the kernels) into fragments.

In one example, at least one of the rollers 118 and 120 is mounted for movement under control of actuator 122. Actuator 122 can be an electric motor, a hydraulic actuator, or any other actuator which drives movement of at least one of the rollers relative to the other, to change the size of the gap between rollers 118 and 120 (the kernel processing gap). When the gap size is reduced, this can cause the kernels to be broken into smaller fragments. When the gap size is increased, this can cause the kernels to be broken into larger fragments, or (if the gap is large enough) even to remain unbroken. The kernel processing rollers 118 and 120 can have surfaces that are relatively cylindrical, or the surfaces of each roller can have fingers or knives which protrude therefrom, and which cooperate with fingers or knives of the opposite kernel processing roller, in an interdigitated fashion, as the rollers turn. These and other arrangements or configurations are contemplated herein.

The processed crop is then transferred by rollers 118-120 to conveyor 124. Conveyor 124 can be a fan, or auger, or other conveyor that conveys the harvested and processed material upwardly generally in the direction indicated by arrow 126 through chute 128. The crop exits chute 128 through spout 130.

In the example shown in FIG. 1, chute 128 includes a sensor system 131 disposed within a housing 132 disposed on a side thereof. Sensor system 131 can be separated from the interior of chute 128 by an optically permeable barrier 134. Barrier 134 can be, for instance glass, plastic, or another barrier that permits the passage of at least certain wavelengths of light therethrough. Housing 132 illustratively includes a radiation source 136, a radiation sensor 138, and an image capture device 140. Radiation source 136 illustratively illuminates the crop passing through chute 128 with radiation. Radiation sensor 132 detects radiation that is fluoresced or otherwise transmitted from the crop (e.g., reflected from), and image capture device 140 captures an optical image of the crop. Based on the image and the sensed radiation, crop constituent level value(s), such as concentration(s) indicative of the concentration of one or more constituents of the harvested crop passing through chute 128 is identified. In one example, sensor system 131 utilizes near-infrared-reflectance (NIR) or visible near-infrared-reflectance (Vis-NIR) in detecting various characteristics, such as constituent values, of the crop passing through chute 129.

In one example, sensor system 131 is an NIR spectrometer. In one example, sensor system 131 is a Vis-NIR spectrometer.

The constituent values can be passed to a control system which can control the harvester 100 based thereupon. For example, the control system can control the position of header relative to the surface of the worksite 151 based on the value of one or more constituents, such as based on the concentration of starch. The control system can generate one or more control signals to control the one or more actuators 123 to actuate to adjust the position (e.g., height, tilt, roll, etc.) of header 108. In other examples, the one or more constituent values can be provided to the operator or to a user, such as by display and/or audible outputs, and the operator or the user can adjust the position of header 108 via an input through an input mechanism (e.g., button, lever, joystick, etc.) disposed within operator compartment 150 or through an input mechanism located remotely from but communicably coupled to forage harvester 100 and accessible by the user.

It will also be noted that, in another example, instead of having the sensor system 131 in housing 132 sense characteristics of the crop passing through chute 128, a sample of the crop can be diverted into a separate chamber, where its motion is momentarily stopped so the reading can be taken and the characteristics can be sensed. The crop can then be passed back into the chute 128 where it continues to travel toward spout 130. In other examples, the sensors can be placed at other locations within harvester 100, such as disposed along the flow path of crop as it travels through harvester 100. These and other arrangements and configurations are contemplated herein.

As shown in FIG. 1, harvester 100 can include one or more observing sensors 133 configured to observe an area of interest of the worksite 151 around harvester 100. In one example, observing sensors 133 can include one or more imaging systems such as cameras, radar, lidar, etc., configured to detect one or more areas of interest around harvester 100. In one example, observing sensors 133 detect crop ahead of and/or around harvester 100 and generate sensor signals indicative of a height of the crop at worksite 100, such as an average height of crop ahead of harvester 100 across an area of interest (e.g., width of header 108) or field of view of the sensor(s) 133. It will also be noted that harvester 100 can include various other sensors, some of which will be described below.

Figure 2:
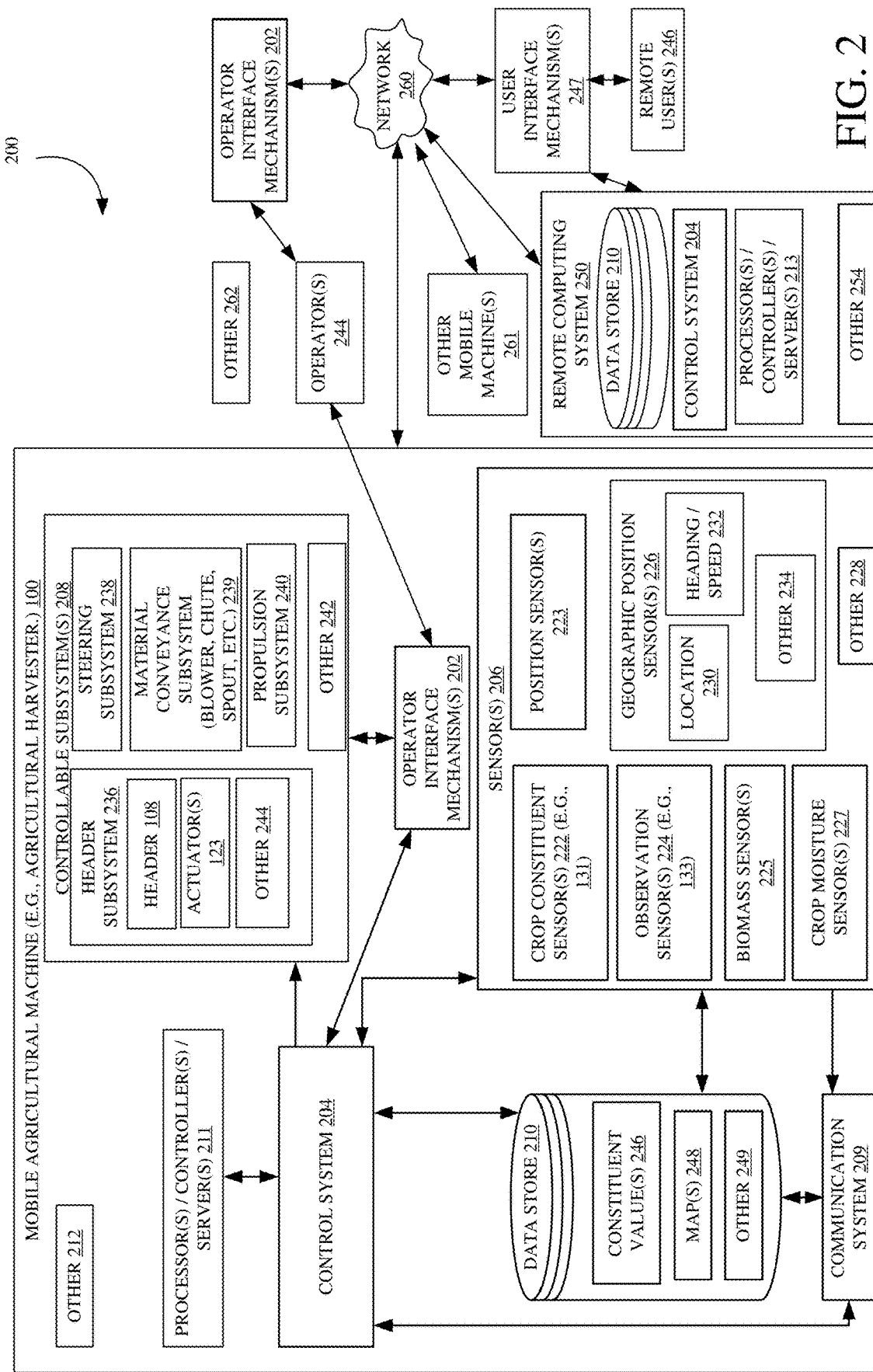
FIG. 2 is a block diagram showing some portions of an agricultural system architecture, including an agricultural harvesting machine, according to some examples of the present disclosure.

FIG. 2 is a block diagram of one example agricultural system architecture 200 having, among other things, a mobile agricultural machine 100 (e.g., an agricultural harvesting machine, such as a forage harvester) configured to perform an operation at a worksite. Agricultural system architecture 200 further includes one or more operators 244, one or more operator interfaces 202, one or more remote users 246, one or more remote user interface mechanisms 247, remote computing system 250, network 260, one or more other mobile machines 261, and can include other items 262 as well. Mobile machine 100, itself, includes one or more operator interface mechanisms 202, control system 204, one or more sensors 206, one or more controllable subsystems 208, communication system 209, data store 210, one or more processors, controllers, and/or servers 211, and can include other items 212 as well.

FIG. 2 shows that sensors 206 can include any number of different types of sensors that sense or otherwise detect any number of characteristics. As illustrated, sensors 206 can include one or more crop constituent sensors 222, one or more observation sensors 224, one or more position sensors 223, one or more biomass sensors 225, one or more geographic position sensors 226, one or more crop moisture sensors 227, and can include other items 228, such as various other sensors, as well. Geographic position sensors 226 include one or more location sensors 230, one or more heading/speed sensors 232, and can include other items 234, such as other sensors, as well.

Controllable subsystems 208 includes header subsystem 236, steering subsystem 238, material conveyance subsystem 239, propulsion subsystem 240, and can include other controllable subsystems 242 as well. As illustrated, header subsystem 236 can include header 108, one or more actuators 123, and can include other items 244 as well.

Data store 210, itself, includes constituent values data 246, one or more maps 248, and can include various other data 249 as well.

Control system 204 is configured to control other components and systems of architecture 200, such as components and systems of mobile machine 100. For instance, control system 204 is configured to control communication system 209. Communication system 209 is used to communicate between components of mobile machine 100 or with other items such as remote computing system 250, operators 244 (via operator interface mechanisms 202), remote users 246 (via user interface mechanisms 247), and/or one or more other mobile machines 261 (e.g., one or more other forage harvesters, one or more aerial vehicles such as UAVs, drones, satellites, etc., as well as various other mobile machines) over network 260. Network 260 can be any of a wide variety of different types of networks such as the Internet, a cellular network, Bluetooth, a wide area network (WAN), a local area network (LAN), a controller area network (CAN), a near-field communication network, or any of a wide variety of other networks or combinations of networks or communication systems.

Remote users 246 are shown interacting with remote computing system 250, such as through remote user interfaces mechanism(s) 247. Remote computing system 250 can be a wide variety of different types of systems. For example, remote computing system 250 can be in a remote server environment. Further, remote computing system 250 can be a remote computing system (such as a mobile device), a remote network, a farm manager system, a vendor system, or a wide variety of other systems. As illustrated, remote computing system 250, itself, can include data store 210, control system 204, one or more processors, controllers, and/or servers 213, and can include various other items 254 as well. For example, the data stored and accessed by various components in architecture 200 can be remotely located in data stores 210 on remote computing system 250, alternatively or in addition to data store 210 on mobile machine 100. Thus, data store 210 can be located on either mobile machine 100 or remote computing system 250, can be located on both mobile machine 100 or remote computing system 250, or portions of data store 210 can be located at mobile machine 100 while other portions of data store 210 are located on remote computing system 250. Additionally, control system 204 can be remotely located on remote computing system alternatively or additionally to control system 204 on mobile machine 100 and thus various components of architecture 200 can be controlled by control system 204 located remotely at remote computing system 250. Thus, in one example, a remote user 246, can control mobile machine 100 remotely, such as by user input received by user interfaces 247. These are merely some examples of the operation of architecture 200.

FIG. 2 also shows one or more operators 244 interacting with mobile machine 100 and remote computing system 250, such as through one or more operator interfaces 202. As illustrated operator interfaces 202 can be located on mobile machine 100, can be separate from mobile machine 100 but connected with mobile machine 100 and/or components thereof, such as through network 260, or both. For instance, some of operator interfaces 202 may be located on mobile machine 100 such as within operator compartment 150 while other of operator interfaces 202 may be separate or separable, such as a mobile device communicably coupled with mobile machine 100 and/or components thereof over network 260.

Before discussing the overall operation of mobile machine 100, a brief description of some of the items in mobile machine 100, and their operation, will first be provided.

Communication system 209 can include various communication circuitry and/or communication logic, such as substantially any wireless communication system that can be used by the systems and components of mobile machine 100 to communicate information to other items, such as among components of mobile machine 100 itself, or between components of mobile machine 100 and other components of architecture 200. In another example, communication system 209 can include, alternatively or in addition to a wireless communication system, substantially any wired communication system, for instance a controller area network (CAN) bus or another network (such as an Ethernet network, etc.) to communicate information among components of computing architecture 200.

Crop constituent sensors 222, which can include crop constituent sensor system 131, are configured to sense or otherwise detect variables indicative of crop constituent values in crop encountered and/or processed by mobile machine 100. For example, crop constituent sensors provide sensor outputs (e.g., sensor signals) having value(s) indicative of crop constituent values(s) (e.g., concentration, amount, percentage, etc.) of one or more crop constituents within crop encountered and/or processed by mobile machine 100, such as a value of starch, a value of sugar, a value of carbohydrates, a value of fiber, such as lignan, a value of protein, a value of oil, a value of mineral, a value of pathogen, a value of contaminant, as well as various other values of various other constituents. In some examples, crop constituent sensors 222 utilize NIR or Vis-NIR, such as NIR or Vis-NIR spectrometry and/or NIR or Vis-NIR imaging, to sense or otherwise detect variables indicative of crop constituent concentrations and can utilize a radiation source, such as a light source that emits radiation of a given or desired wavelength and a radiation sensor such as a radiation receiver (e.g., a sensor array) that receives the radiation reflected from the crop. Additionally, or alternatively, crop constituent sensors can include an imaging device that captures images of the irradiated crop. Crop constituent sensors 222 can be disposed at various locations on or within mobile machine 100 such as along the flow path of crop within mobile machine 100, for instance, on or within chute 128.

Observation sensors 224, which can include observation sensors 133, are configured to sense or otherwise detect variables indicative of various characteristics of the environment around mobile machine 100, such as characteristics relative to the worksite and/or characteristics relative to vegetation (e.g., crop plants) on the worksite. For example, observation sensors 224 can sense or otherwise detect variables indicative of crop volume, crop density, crop height, or biomass of crop plants ahead of and/or around mobile machine 100. In some examples, information generated by observation sensors 224 in combination with other information, such as topographic information indicative of an elevation of the worksite, can be used to identify height, such as average height, in an area of interest around mobile machine 100. For example, the crop height may measure 5-feet-high by the sensor, however, it may be determined that the crop of interest is on a portion of the worksite that is elevated 2 feet higher than the portion of the worksite on which the machine is currently located, so the actual height of the crop in the sensed area is determined to be 3-feet-high. This is merely an example. Elevation information can be sensed, such as by geographic position sensors 226, or obtained, such as obtained from a topographical map of the worksite (e.g., stored in data store 210), or otherwise, such as stored topographical data (e.g., stored in data store 210) from previous operations on the worksite. Observation sensors 224 can include one or more of imaging systems, such as one or more cameras, LIDAR, RADAR, as well as various other sensors.

Position sensors 223 are configured to sense position information relative to various components of mobile machine 100. For example, a number of position sensors 223 can be disposed at various locations within mobile machine 100 and can thus detect a position (e.g., height, orientation, tilt, etc.) of the various components of mobile machine 100 relative to the worksite or relative to other components of mobile machine 100. For example, position sensors 223 can sense the position (height, tilt, roll, etc.) of header 108 relative to the surface of the worksite and/or the position of header 108 relative to other components of mobile machine 100, such as a frame of mobile machine 100. From the position of the header, a height of cutter 104 can be derived, and thus the height at which crop is cut (e.g., cut height) can be derived. In some examples, the position of components of mobile machine 100 can be calculated based on a sensor signal and the known dimensions of mobile machine 100.

Biomass sensors 225 are configured to sense characteristics indicative of a biomass of the crop processed by mobile machine 100. For example, biomass sensors 225 can include a force sensor, such as a pressure sensor or torque sensor, that sense a force (e.g., a hydraulic pressure, torque, etc.) used to drive a component of the mobile machine that processes the crop, such as chopper 114 or rollers 118 and 120, at a set speed. As the biomass of the crop being processed by the component (e.g., chopper or rollers) increases or decreases, the amount of force needed to drive the component at the set speed also changes. Biomass can be used as indicator of resultant yield (e.g., tonnage) of processed crop.

Geographic position sensors 226 include one or more location sensors 230, one or more heading/speed sensors 232, and can include other sensors 234 as well. Location sensors 230 are configured to determine a geographic location of mobile machine 100 on the worksite at which it is operating. Location sensors 230 can include, but are not limited to, a Global Navigation Satellite System (GNSS) receiver that receives signals form a GNSS satellite transmitter. Location sensors 230 can also include a Real-Time Kinematic (RTK) component that is configured to enhance the precision of position data derived from the GNSS signal. Location sensors 230 can include various other sensors, including other satellite-based sensors, cellular triangulation sensors, dead reckoning sensors, etc. In some examples, a GNSS receiver is used to detect a pose (position and orientation) of the receiver at a given point in time. By knowing the pose of the receiver, and the dimensions of the mobile machine 100, and the orientation with which the receiver is affixed to the harvester, the ground pose of the harvester can be estimated at a point directly under the vehicle. Again, using vehicle geometry, the ground pose is used to estimate points on the ground directly under one or more of the ground-engaging elements (e.g., 104 and/or 106, and/or under the front axle or rear axle, or both). These estimate points can be used to estimate ground elevation of the worksite.

Heading/speed sensors 232 are configured to determine a heading and speed at which mobile machine 100 is traversing the worksite during operation. Heading/speed sensors 232 can include sensors that sense the movement of ground-engaging elements (e.g., 104 or 106) or can utilize signals received from other sources, such as location sensors 230.

Crop moisture sensors 227 are configured to sense a characteristic indicative of a moisture level of crop. Without limitation, these crop moisture sensors may include a capacitance sensor, a microwave sensor, or a conductivity sensor, among others. In some examples, the crop moisture sensor may utilize one or more bands of electromagnetic radiation in detecting the crop moisture. Crop moisture sensors 227 can include a capacitive moisture sensor. In one example, the capacitance moisture sensor can include a moisture measurement cell for containing the crop material sample and a capacitor for determining the dielectric properties of the sample. In other examples, the crop moisture sensor may be a microwave sensor or a conductivity sensor. In other examples, the crop moisture sensor may utilize wavelengths of electromagnetic radiation for sensing the moisture content of the crop material. The crop moisture sensor can be disposed along the flow path of processed crop within mobile machine 100, such as within the chute 128 (or otherwise have sensing access to crop material within chute 128). and configured to sense moisture of processed crop material. In other examples, the crop moisture sensor may be located at other areas within agricultural harvester 100. It will be noted that these are merely examples of crop moisture sensors, and that various other crop moisture sensors are contemplated. In one example, the moisture of the crop can be used to derive a resultant yield (e.g., tonnage) of the crop. In one example, the moisture of the crop can be used in combination with the biomass of the crop to derive resultant yield (e.g., tonnage) of the crop.

Mobile machine 100 can include various other sensors 228 which can include, but are not limited to, operating parameter sensors that sense or otherwise detect characteristics relative to machine settings and/or operating parameters of various components of mobile machine 100. Sensors 206 can comprise any number of different types of sensors. such as potentiometers, Hall Effect sensors, as well as various mechanical and/or electrical sensors. Sensors 206 can also include various electromagnetic radiation sensors, optical sensors, imaging sensors, thermal sensors, LIDAR, RADAR, sonar, radio frequency sensors, audio sensors, inertial measurement units, accelerometers, pressure sensors, flowmeters, etc. Additionally, while multiple sensors are shown detecting or otherwise sensing respective characteristics, sensors 206 can include a sensor configured to sense or detect a variety of the different characteristics and can produce a single sensor signal indicative of the multiple characteristics. For instance, sensors 206 can include an imaging sensor that can generate an image that is indicative of multiple different characteristics relative to mobile machine 100 and/or the environment of mobile machine 100. These are merely some examples.

Additionally, it is to be understood that some or all of the sensors 206 can be a controllable subsystem of mobile machine 100. For example, control system 204 can generate control signals to control the operation, position, as well as various other operating parameters of sensors 206. For instance, control system 204 can generate control signals to adjust the position or operation of observational sensors 224, such as to adjust their line of sight or field of view, or both. In another example, control system 204 can generate control signals to control the operation of crop constituent sensors 222, such as to control the activation and/or deactivation of crop constituent sensors 222, the sampling frequency, as well as various other operating parameters. These are merely some examples.

Controllable subsystems 208 includes header subsystem 236, steering subsystem 238, material conveyance subsystem 239, propulsion subsystem 240, and can include other subsystems 242 as well.

Header subsystem 236, which can include header 108, one or more actuators 123, as well as various other items 244, is controllable to control the position of header 108 such as by actuation of actuators 123. Actuators 123 can comprise hydraulic, electric, pneumatic, mechanical, electromechanical, as well as various other types of actuators. In one example, actuators 123 can be actuated, such as by control system 204, operators 244, or remote users 246, to set and/or adjust the position (e.g., height, tilt, roll, etc.) of header 108 relative to the surface of the worksite at which mobile machine 100 is operating. For example, the position of header 108 can be adjusted to achieve a desired (e.g., target) crop constituent value and/or a desired (e.g., target) yield (e.g., tonnage) value. For instance, the position of header 108 can be adjusted to achieve a desired starch concentration and tonnage of corn silage produced by mobile agricultural machine 100.

Steering subsystem 238 is controllable to control the heading of mobile machine 100, by steering the ground engaging elements (e.g., 104 and/or 106). Steering subsystem 238 can be controlled to adjust the heading of mobile machine 100 by control system 204, operators 244, or remote users 246. In some examples, steering subsystem 238 can automatically adjust and/or set the heading of mobile machine 100 based upon a commanded route and/or based upon a commanded route and sensor signals indicative of current position and/or heading of mobile machine 100.

Material conveyance subsystem 239, which can include a blower or auger, spout (e.g., 130), chute (e.g., 128), as well as other items controllable to control the delivery or conveyance of crop material from mobile machine 100 to a receiving area, such as a cart or trailer pulled by another vehicle, a storage receptacle, the ground, etc. For example, material conveyance subsystem 239 can be controlled to control the delivery or conveyance of crop material by control system 204, operators 244, or remote users 246. In one example, the position of chute and/or spout can be set and/or adjusted. For example, chute can be rotated to deliver crop materials to receiving areas located at various locations relative to mobile machine 100, such as to a cart and/or trailer behind or to the side of mobile machine 100. The position of spout 130 can be controlled to adjust or set a trajectory of crop material exiting spout 130. The operation of a blower or auger, which propels crop material through chute 128 and spout 130, can be adjusted or set, for example, activated and/or deactivated, increase output or decrease output, etc.

Propulsion subsystem 240 is controllable to propel mobile machine 100 over the worksite surface, such as by driving movement of ground engaging elements (e.g., 104 and 106). It can include a power source, such as an internal combustion engine or other power source, a set of ground engaging elements, as well as other power train components (e.g., transmission, differential, axle, etc.). In one example, propulsion subsystem 240 can be controlled to adjust and/or set the movement and/or speed of movement of mobile machine 100 by control system 204, operators 244, or remote users 246.

Other controllable subsystems 242 can include various other controllable subsystems, including, but not limited to those described above with regard to FIG. 1.

Data store 210 can include constituent values data 246, one or more maps(s) 248, and can include various other data 249 as well. Constituent values data 246 can include crop constituent values as provided by crop constituent sensors 222 or derived from information sensed or detected by crop constituent sensors 222. Constituent values data 246 can also include historical crop constituent values from previous operations at the worksite, from previous operations at various other worksites, for example, previous operations at other worksites with the same crop species and/or crop genotype, as well as various other historical crop constituent values. Crop constituent values data 246 can also include crop constituent values typical for a given crop type, such as a crop species or crop genotype (e.g., hybrid, cultivar, etc.) as well as typical crop constituent values derived from expert knowledge. Constituent values data 246 can also include constituent values provided by a third-party, such as by a seed supplier. For instance, some seed suppliers provide constituent values for crop plants resulting from their seeds. Other third-party sources can also provide constituent values, such as Internet sources, agricultural journals, etc. The constituent values of constituent values value data 246 can include crop constituent distributions, that is crop constituent values at different points along the length of crop plants. In some examples, the constituent values in constituent value data 246 also contain corresponding heights at which the crop, to which the values correspond, were cut. These are merely some examples.

Maps 248 can include a priori maps (e.g., maps generated on the basis of data collected or known prior to the mobile machine 100 operating at the worksite in the given season) as well as in-situ maps (e.g., maps generated on the basis of data collected while mobile machine 100 operates at the worksite in the given season). Maps 248 can be obtained in various ways. For example, one or more maps 248 can be generated, such as by map generator 352, as will be discussed in more detail below. In some examples, one or maps can be obtained from previous operations, from other mobile machines, from surveys of the worksite, such as human surveys or aerial surveys, or both. In another example, one or more maps 248 can be obtained from third-party sources. These are merely some examples.

Data store 210 can include various other data 249 such as various other information provided by sensors 206, various information provided by operators 244 and/or remote users 246, such as operator or user selected targets, data from previous operations on the worksite, observational data from surveys of the field (e.g., aerial, satellite, human surveys, etc.), various other sensor data, agricultural characteristic data relative to the worksite, growing condition data, such as weather conditions, soil characteristics, nutrient levels, etc., crop type data, such as crop species and crop genotype (e.g., hybrid, cultivar, etc.) data, as well as various information obtained through third-parties, such as Internet sources, broadcasting sources, etc.

Control system 204 is configured to receive or otherwise obtain various data and other inputs, such as sensor signals, user or operator inputs, data from data stores, and various other types of data or inputs. Based on the data and inputs, control system 204 can make various determinations and generate various control signals to control other components of architecture 200, such as mobile machine 100. The operation of control system 204 will be discussed in greater detail in FIG. 3, described below.

Mobile machine 100 can include various other items 212 as well.

Figure 3:
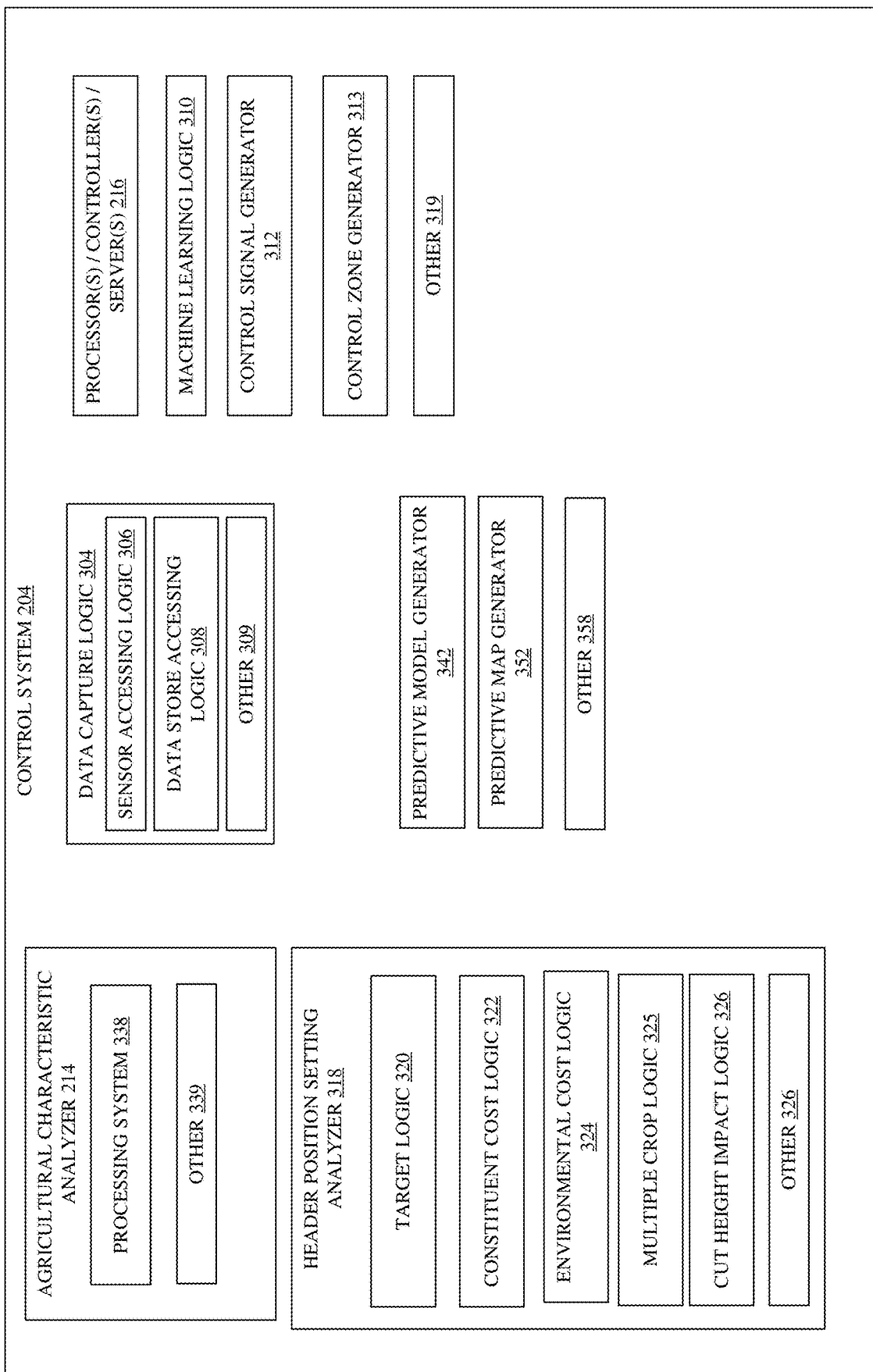
FIG. 3 is a block diagram showing one example of a control system shown in more detail.

FIG. 3 is a block diagram illustrating one example of control system 204 in more detail. Control system 204 can include agricultural characteristic analyzer 214, one or more processors, controllers, and/or servers 216, predictive model generator 342, predictive map generator 352, data capture logic 304, machine learning logic 310, control signal generator 312, control zone generator 313, header position setting analyzer 318, and can include other items 319, as well. Agricultural characteristic analyzer 214, itself, can include processing system 338, and can include other items 339 as well. Data capture logic 304, itself, can include sensor accessing logic 306, data store accessing logic 308, and can include other items 309 as well. Header position setting analyzer 318, itself, can include target logic 320, constituent cost logic 322, environmental cost logic 324, multiple crop logic 325, cut height impact logic 326, and can include other items 327, as well.

In operation, control system 204 identifies values of agricultural characteristics, such as crop constituent values, yield (e.g., tonnage) values, header height/cut height values, biomass values, crop moisture values, crop height values, etc. of crop at the worksite or processed by mobile machine 100 as indicated by sensor information obtained from sensors 206 or as derived from values of crop constituents as indicated by maps obtained by control system 204, or both. Control system 204 generates outputs indicative of one or more agricultural characteristic values of crop at the worksite or processed by mobile machine 100. Control system 204 can generate control signals, through control signal generator 312, based on the crop constituent values to control the operation of one or more components of architecture 200. For example, control system 204 can generate control signals to adjust and/or set the position of header 108 based on one or more of constituent values, tonnage values, header height/cut height values, as well as various other values. Additionally, control system 204 can generate control signals to control one or more interface mechanisms (e.g., operator interface mechanisms 202, user interface mechanisms 247, etc.) to provide an indication (e.g., display, audible output, haptic output, etc.) of one or more of the values, such as the crop constituent values (e.g., concentrations, amount, percentage, etc.), the tonnage values, the header height/cut height values, as well as various other values. Additionally, the values determined or identified by control system 204 can be communicated with other components of architecture 200, via communication system 209, such as with data store 210, model generator 342, map generator 352, remote computing system 250, other mobile machines 261, etc.

Data capture logic 304 captures or obtains data that can be used by other items in control system 204. Data capture logic 304 can include sensor accessing logic 306, data store accessing logic 308, and other logic 309. Sensor accessing logic 306 can be used by control system 204, and components thereof, to obtain or otherwise access sensor data (or values indicative of the sensed variables/characteristics) provided from sensors 206, as well as other sensors. For illustration, but not by limitation, sensor accessing logic 306 can obtain sensor signals indicative of crop constituent values of crop processed by mobile machine 100 as provided by crop constituent sensors 222.

Data store accessing logic 308 can be used by control system 204, and components thereof, to obtain or otherwise access data previously stored on data store 210. For example, this can include constituent values data 246, maps 248, as well as various other data 249.

Upon obtaining the various data, agricultural characteristic analyzer 214 analyzes or processes the data to determine agricultural characteristic values, such as crop constituent values, yield (e.g., tonnage values), biomass values, crop moisture values, crop height values, header height/cut height values, as well as various other values. Agricultural characteristic analyzer 214 includes processing system 338. In one example, processing system 338 obtains data, such as sensor signals indicative of agricultural characteristic values, to identify or determine the values of the agricultural characteristics. Thus, processing system 338 processes sensors signals generated by sensors 206 to identify or determine values of agricultural characteristics detected by sensors 206, or to identify or determine values of agricultural characteristics indicated by the sensor signals. In one example, processing system 338 processes sensors signals generated by crop constituent sensors 222 to identify or determine values of crop constituents of crop detected by crop constituent sensors 222. In one example, processing system 338 processes sensor signals generated by biomass sensors 225 to identify or determine values of crop biomass of crop detected by biomass sensors 225. In one example, processing system 338 processes sensor signals generated by observation sensors 224 to identify or determine values of characteristics detected by observation sensors 224, such as height of crop at the worksite. In one example, processing system processes sensor signals generated by crop moisture sensors 227 to identify or determine values of crop moisture of crop detected by crop moisture sensors 227. In one example, processing system 338 processes sensor signals generated by position sensors 223 to identify or determine values of a height (or other positional information, such as pitch, roll, etc.) of header 108. In some examples, processing system 338 identifies or determines values of agricultural characteristics indicated by the sensors signals generated by sensors 206, for instance, based on one or more of crop height value, crop moisture value, crop biomass value, processing system 338 can identify or determine a yield (e.g., tonnage) value of the crop. In another example, based on the height (or other positional information) value, processing system 338 can identify or determine a cut height value. These are merely some examples.

Processing system 338 can include various filtering logic, signal processing logic, image processing logic, conversion logic, aggregation logic, as well as various other logic. In one example, sensor signals and/or the values derived from the sensor signals can be aggregated, such as to generate a rolling average of one or more agricultural characteristic values. In one example, processing system 338 can include noise filtering logic to filter out signal noise. In another example, where the sensor signal is a raw sensor output (e.g., output voltage) the sensor signal can be converted into a value, such as concentration percentage or some other value, by converting the sensor output into the value, such as by a look-up table, function, or other conversion. In other examples, conversion logic can include conversion circuitry, such as an analog-to-digital converter. These are merely some examples.

In other examples, processing system 338 analyzes or processes data provided by maps (e.g., maps 248) obtained by control system 204 to determine values of agricultural characteristics at the worksite, as indicated by the map(s). For example, control system 204 can obtain predictive crop constituent maps, which can include geolocated, predictive values of crop constituents at different geographic locations across the field. Agricultural characteristic analyzer 214 can, based on the values in the obtained maps, as well as other data, such as geographic location data indicative of a location of mobile machine 100, provide an output indicative of crop constituent values of crop at the worksite, such as crop located around mobile machine 100.

In other examples, processing system 338 analyzes or processes data obtained by control system 204 (e.g., crop constituent values data 246, other data 249) to identify or determine values of agricultural characteristics.

Based on the various data, agricultural characteristic analyzer 214 provides output(s) indicative of agricultural characteristic values, such as values of agricultural characteristics of crop at the worksite or processed by mobile machine 100. Based on these output(s), control system 204 can generate various control signals to control various other items of architecture 200. For example, control system 204 can generate control signals to control operation of mobile machine 100, such as by controlling one of the controllable subsystems 208, for instance, controlling header subsystem 236 to change a position (e.g., height, pitch, roll, etc.) of header 108 and/or to set or adjust a position setting of header 108. In another example, control system 204 can generate control signals to control an interface mechanism, such as mechanisms 202 and/or 247, to provide an indication (e.g., display, audible output, haptic output, etc.) of and/or based on the output(s). The outputs can be provided to or otherwise obtained by various other items of control system 204 as well as by other items of architecture 200.

As illustrated in FIG. 3, control system 204 further includes predictive map generator 352. Map generator 352 is configured to generate a variety of maps based on one or more obtained maps (e.g., a priori maps, in-situ maps, etc.) and obtained data, such as sensor signals provided by in-situ sensors or data obtained from other sources, such as data from data store 210. In other examples, the in-situ sensors can be associated with another machine, such as a drone, satellite, etc. and can provide in-situ sensor information to control system 204 over a network, such as network 260. In other examples, humans, such as an operator, user, or other human, that observe the worksite, can provide in-situ data, such as through an input on an interface mechanism (e.g., 202 or 247) and/or over a network, such as network 260.

Predictive model generator 342 generates a model (e.g., a relationship, such as a function, a table, a matrix, a set of rules, a neural network, etc.) based on values provided by the one or more obtained maps and values provided by the obtained data (e.g., sensor signals, data from data store, etc.). For example, obtained map(s) can provide geolocated values of one or more agricultural characteristics at different locations across a worksite. Obtained data, such as in-situ sensor signals provided by an in-situ sensor 206 (e.g., crop constituent sensor 222) or data obtained from other sources (e.g., data store 210) can provide or be the basis for geolocated values of agricultural characteristics, such as crop constituents, tonnage, etc., at the worksite. Model generator 342 can then generate a model, modeling a relationship between the value(s) provided by the obtained map(s) and the values provided by the obtained data. For example, model generator 342 can generate a model that models the relationship between one or more values provided by one or more obtained maps for a given location of the worksite and in-situ values of agricultural characteristics as provided by in-situ sensors 206 for that given location. The model generated by predictive model generator 342 can then be used to predict one or more agricultural characteristics at different geographic locations in the worksite based on the value(s) in the obtained map(s) at those different geographic locations. This is merely an example.

Thus, predictive map generator 352 can, based on the predictive model generated by predictive model generator 342 and value(s) provided by the obtained map(s), generate a predictive map having predictive values of agricultural characteristics at different locations at the worksite.

An example operation of predictive model generator 342 and predictive map generator 352 map generator 218 will be described in greater detail in FIG. 4.

Control system 204 can generate various control signals based on the generated predictive models or the generated predictive maps, or both, maps to control various other items of architecture 200. For example, control system 204 can generate control signals to control operation of mobile machine 100, such as by controlling one of the controllable subsystems 208, for instance, controlling header subsystem 236 to change a position (e.g., height, pitch, roll, etc.) of header 108 or to adjust or set a header position setting. In another example, control system 204 can generate control signals to control an interface mechanism, such as mechanisms 202 and/or 247, to provide an indication (e.g., display, audible output, haptic output, etc.) of and/or based on the map(s), or the values therein, or both. The map(s) and/or the data thereof can be provided to or otherwise obtained by various other items of control system 204 as well as by other items of architecture 200.

FIG. 3 also shows that control system 204 can include header position setting analyzer 318. Header position setting analyzer 318 can determine a header position setting for controlling a header of the mobile machine to position header 108 of mobile machine 100 to achieve a given cut height of crop at the worksite. Header position setting analyzer 318 includes target logic 320, constituent cost logic 322, environmental cost logic 324, multiple crop logic 325, cut height impact logic 326, and can include other items 327 as well.

Target logic 320 obtains or generates, or both, various targets for operation parameters of mobile machine 100, such as target cut heights, target header positions or target header position settings, and/or various targets for performance parameters of the agricultural operation performed by mobile machine 100, such as target constituent values in processed crop or target tonnage of processed crop, or both. The targets are used by header position setting analyzer 318 for identifying header position settings and for controlling header 108 of mobile machine 100.

The targets can be provided by an operator 244, a user 246, or can be a stored target and obtained from a data store, such as data store 210, such as a target from a previous operation. The targets can be generated by target logic 320 on the basis of various data, such as values provided by maps obtained by control system 204, sensor data, data stored in data store 210, data provided by an operator 244 or user 246, as well as various other data. The targets can comprise thresholds, such as a value or a range of values (e.g., a range extending between a minimum/lower limit and maximum/ upper limit value), for instance a range of header positions, a maximum or minimum header position, etc.

Target logic 320 can also obtain various data indicative of a current operation parameter, such as a current cut height, current header position, or current header position setting, and compare the current operation parameter to the target operation parameter, such as a target cut height, target header position, or target header position setting, to determine if the current setting satisfies the target setting (e.g., identify a difference between current and target) and provide an output indicative of the comparison. On the basis of this output, header position setting analyzer 318 can identify a header position setting for controlling the position of header 108. Additionally, target logic 320 can obtain various data indicative of a current performance parameter of mobile machine 100, such as current crop constituent value(s) of processed crop or a current tonnage of processed crop, or both, and compare the current performance parameter to the target performance parameter, such as target crop constituent value(s) of processed crop or a target tonnage of processed crop, to determine if the current performance parameter satisfies the target performance parameter (e.g., identify a difference between current value(s) and target value(s)) and provide an output indicative of the comparison. On the basis of this output, header position setting analyzer 318 can identify a header position setting for controlling the position of header 108.

Constituent cost logic 322 can apply a cost model (e.g., function, a table, a matrix, a set of rules, a neural network, etc.) to generate an output, on the basis of which header position setting analyzer 318 can identify a header position setting for controlling the position of header 108 to achieve a crop cut height. Constituent cost logic 322 can obtain various data for use in the constituent cost model, such as data obtained from other items of architecture 200. The operation of constituent cost logic 322 will be described in greater detail in FIG. 6.

Environmental cost logic 324 can apply an environmental cost model (e.g., function, a table, a matrix, a set of rules, a neural network, etc.) to generate an output, on the basis of which header position setting analyzer 318 can identify a header position setting for controlling the position of header 108 to achieve a crop cut height. Environmental cost logic 324 can obtain various data for use in the environmental cost model, such as data obtained from other items of architecture 200. The operation of environmental cost logic 324 will be described in greater detail in FIG. 7.

Multiple crop logic 325 can consider various values, such as crop constituent values, for a worksite where multiple types of crops are present and are to be harvested by mobile machine 100. These values can be obtained from other items of architecture 200. For example, there may be one or more different genotypes (e.g., hybrids) of the same type of crop (e.g., corn) on the same worksite. The crop constituent values for each respective genotype may vary in distribution, and thus, the header position setting for each genotype may conflict. At certain areas of the field, header 108 may encounter both genotypes concurrently, for instance, due to the width of the header and the spacing of the respective genotypes of crops. Multiple crop logic 325 can provide an output to be used by header position setting analyzer 318 for the control of controllable subsystems. For example, an operator or user can direct multiple crop logic 325 to prioritize one genotype (e.g., hybrid) over another. Thus, multiple crop logic 325 can generate an output indicative of a header position setting based on the values corresponding to the prioritized genotype. In another example, an operator or user can direct multiple crop logic 325 to optimize a header position setting based on the values of both genotypes, for instance, maximize resultant starch content given the constituent distributions of both genotypes. These are just some examples.

Additionally, some worksites are intercropped, and thus there are multiple types of crops present at the worksite, for instance, both winter wheat and soybean. Winter wheat is often harvested while the relay-cropped soybeans are relatively short. The minimum header height for the wheat may be constrained by the need to prevent damage to the soybeans. Thus, multiple crop logic can output a header position setting that is constrained by the cut height requirements of soybeans for areas of the field where the soybean plants are present and will be engaged by the header concurrently with winter wheat. In another example, multiple crop logic 325 can be directed to maximize one or more values (e.g., tonnage values, constituent values, etc.) based on the values of both crop types and can thus generate an output indicative of a header position setting that maximizes the one or more values of both crop types. These are just some examples.

Cut height impact logic 326 can consider various data, such as crop type, growing season, historical values, etc., and generate an output indicative of a header position setting based on the crop type and an identified impact of a cut height given the crop type. For instance, certain crops, such as alfalfa, can be cut multiple times throughout a growing season. The cut height of alfalfa is often set at a given height (e.g., 3 inches) above the surface of the worksite to increase forage quality, as the lower portions of the alfalfa plants are typically higher in fiber and have fewer quality leaves. However, a lower cut height may result in higher yield (e.g., tonnage), but impact quantity and quality of future cuttings of the crop plant across the growing season. Thus, while cutting alfalfa at a higher height may improve the quality of the forage yield, the overall impact of cutting the alfalfa at a higher height can reduce the overall forage yield produced throughout multiple cutting across the growing season. Reduced overall yield can reduce a resultant milk yield from the feed due to inadequate feed supply, and/or can require acquisition of supplemental feed which can increase costs. These are just some examples.

As illustrated in FIG. 3, control system 204 can include machine learning logic 310. Machine learning logic 310 can include a machine learning model that can include machine learning algorithm(s), such as memory networks, Bayes systems, decisions trees, Eigenvectors, Eigenvalues and Machine Learning, Evolutionary and Genetic Algorithms, Expert Systems/Rules, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning, as well as various other machine learning algorithms. Machine learning logic 310 can improve the processing performed by control system 204, for example, but not limited to, determinations of control recommendations (e.g., cut height recommendations), determination of characteristics (e.g., determination of crop constituent values, tonnage values, etc.), modeling (e.g., modeling relationships between value(s) from one or more obtained maps and in-situ values provided by in-situ sensors 206), predicting values of characteristics (e.g., predicting crop constituent values, tonnage values, etc.) as well as various other processing performed by control system 204. Machine learning logic can be utilized by the other items of control system 204, such as predictive model generator 342.

Control system 204 can also include control zone generator 313. Maps, such as those generated by map generator 352, can be provided to control zone generator 313. Control zone generator 313 groups adjacent portions of an area into one or more control zones based on data values in the provided map that are associated with those adjacent portions. A control zone may include two or more contiguous portions of an area, such as a worksite, for which a control parameter, such as a header position setting, corresponding to the control zone for controlling a controllable subsystem, such as header subsystem 236, is constant. For example, a response time to alter a setting of a controllable setting of a controllable subsystem 208 may be inadequate to satisfactorily respond to changes in values contained in a map. In that case, control zone generator 213 parses the map and identifies control zones that are of a defined size to accommodate the response time of the controllable subsystems 208. In another example, control zones may be sized to reduce wear from actuator movement resulting from continuous adjustment. The control zones may be added to the provided map to obtain a map with control zones. The control zone map can thus be similar to the provided map except that the control zone map includes control zone information defining the control zones.

It will also be appreciated that control zone generator 213 can cluster values to generate control zones and the control zones can be added to the provided map, or to a separate map, showing only the control zones that are generated. In some examples, the control zones may be used for controlling or calibrating the mobile machine 100 or both. In other examples, the control zones may be presented to an operator 244 or to a remote user 246, or both, and used to control or calibrate the mobile machine 100, and, in other examples, the control zones may be presented to an operator 244 or to a remote user 246, or both, or stored for later use, such as in data store 210.

Figure 4:
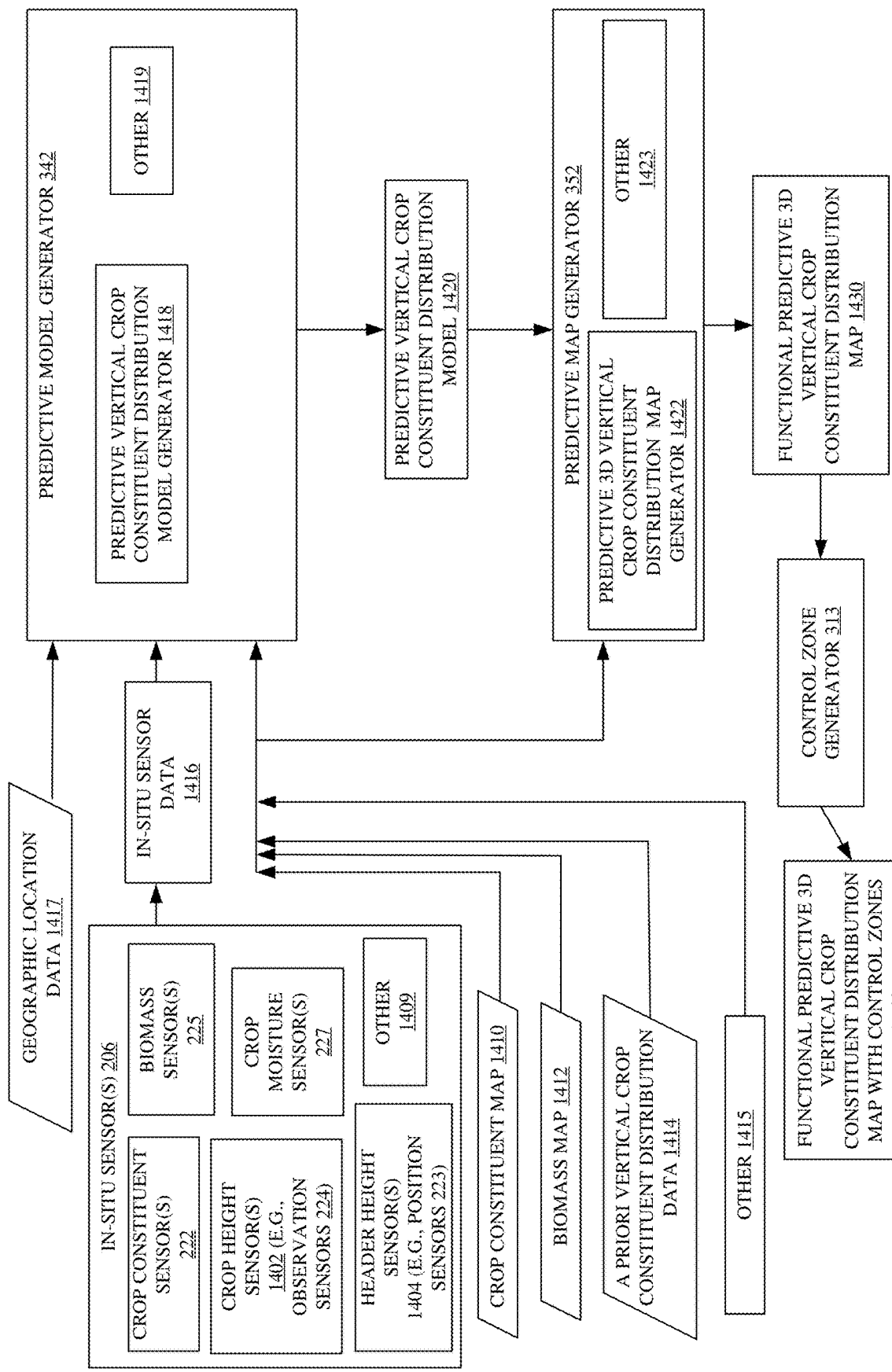
FIG. 4 is a block diagram showing one example of a predictive model generator and a predictive map generator.

FIG. 4 is a block diagram of a portion of architecture 200 shown in FIG. 2. Particularly, FIG. 4 shows, among other things, examples of predictive model generator 342 and predictive map generator 352 in more detail. FIG. 4 also illustrates information flow among the various components shown therein. FIG. 4 illustrates one example of generating a predictive vertical crop constituent distribution model and a predictive 3D vertical crop constituent distribution map. It will be understood that in other examples, a predictive vertical crop constituent distribution model and a predictive 3D vertical crop constituent distribution map can be obtained in various other way and from various other sources. Predictive 3D vertical crop constituent distribution map illustratively shows yield values (e.g., tonnage values) and crop constituent values of crop at various locations at a worksite. The map is referred to as 3D because it shows these values at least at two elevation zones (e.g., cut heights) above the worksite, that is, these values are distributed along a Z axis. For example, the predictive 3D vertical crop constituent distribution map shows, at a given location on the worksite, crop constituent values and tonnage at a first cut height of the crop at that location and a second cut height of the crop at that location. For example, at a given location, the predictive 3D vertical crop constituent distribution map shows that at a cut height of 10 centimeters (cm) the starch value is 20% and the tonnage value is 650 grams, whereas at a cut height of 15 cm, the starch value is 22% and the tonnage value is 600 grams. It will be understood that the predictive 3D vertical crop constituent distribution map can show values at more than two elevation zones (e.g., cut heights) and can also show more than one crop constituent value (e.g., starch value and fiber value, etc.) at those elevation zones. Operation of the predictive model generator 342 and predictive map generator 352 will now be described.

As shown, predictive model generator 342 obtains in-situ sensor data 1416. In-situ sensor data 1416 includes in-situ values of various agricultural characteristics at the worksite provided by or otherwise derived from sensor signals generated by in-situ sensors 206. In-situ sensor data 1416 can include raw sensor signals generated by in-situ sensors 206, processed sensor data, such as characteristic values derived from the sensor signals by processing system 338, as well as various other data. In the illustrated example, in-situ sensor data 1416 can include in-situ crop constituent values as provided by crop constituent sensors 222, in-situ crop height values as provided by crop height sensors 1402 (e.g., observation sensors 224), in-situ biomass values as provided by biomass sensors 225, in-situ crop moisture values as provided by crop moisture sensors 227, in-situ header height values as provided by header height sensors 1404 (e.g., position sensors 223), as well as various other in-situ values as provided by various other in-situ sensors 1409. It will be understood that biomass values, cut height values, crop height values, or crop moisture values, or a combination thereof, can be used to derive yield (e.g., tonnage) values. For example, knowing the height of the crop, the height at which it was cut, the biomass of the processed crop, and the moisture of the crop, a yield (e.g., tonnage) of the processed crop can be derived. Additionally, header height values are used to derive cut height values.

Predictive model generator 342 also obtains geographic location data 1417, such as data derived from geographic position sensors 226. Geographic location data 1417 provides or is used to derive a location at the worksite to which the values indicated by the in-situ data 1416 correspond. In some examples, geographic location data 1417 indicates a position of the mobile machine 100 at the time the characteristic(s) are detected by in-situ sensors 206. The location of the mobile machine 100, in combination with machine delays (e.g., throughput delays, processing delays, etc.), machine speed, travel direction, machine dimensions, sensor characteristics (e.g., sensor location, sensor type, etc.) can be used to determine a location on the worksite to which the characteristics correspond.

Besides obtaining in-situ sensor data 1416 and location data 1417, predictive model generator 342 also obtains one or more maps, such as one or more of a crop constituent map 1410, a biomass map 1412, and another type of map (e.g., 1415). Predictive model generator 342 can also obtain a priori vertical crop constituent distribution data 1414, and can obtain various other data 1415, such as other maps of the worksite.

Crop constituent map 1410 shows crop constituent values at various locations at the worksite. In one example, crop constituent map 1410 contains or is based on historical crop constituent values from previous operation(s), such as previous harvesting operations of crop of a similar genotype. In another example, crop constituent map 1410 can be a predictive crop constituent map having predictive crop constituent values. In one example, predictive crop constituent map is generated on the basis of an a priori analysis of a vegetative index (e.g., NDVI, LAI, etc.) map of the field. In one example, predictive crop constituent map is generated as an output of crop model. In one example, predictive map is based on crop scouting data, such as selective samples of the crop at one or more locations of the worksite that are collected, and lab analyzed. In one example, the predictive crop constituent map is generated by obtaining a map of the worksite, such as a vegetative index map, a soil property map, a biomass map, a yield map, a crop moisture map, a historical crop constituent map, as well as various other agricultural characteristic maps, and by obtaining sensed crop constituent values (e.g., from crop constituent sensors 222) and determining a relationship between the values in the obtained map and the sensed crop constituent values, corresponding to the same locations on the worksite. The determined relationship, in combination with the obtained map, is used to generate a predictive crop constituent map that provides predictive crop constituent values at different locations at the worksite based on the values in the obtained map at those locations and the determined relationship. In other examples, crop constituent map 1410, and the values therein, can be obtained in various other ways.

Biomass map 1412 shows biomass values of the crop at various location at the worksite. Biomass values can include one or more of crop height values, crop density values, crop volume values, as well as crop mass (e.g., weight) values. In one example, biomass map is based on lidar data of the worksite, such as lidar data collected during a survey of the field, such as an aerial survey conducted by an aerial vehicle (e.g., UAV, satellite, plane, etc.). In one example, biomass map 1412 contains or is based on historical biomass values from previous operations. In another example, biomass map can be a predictive biomass map having predictive biomass values. In one example, the predictive biomass map is generated based on an a priori analysis of a vegetative index (e.g., NDVI, LAI, etc.) map of the worksite. In one example, predictive biomass map is generated as an output of a crop model. In one example, predictive biomass map is generated by obtaining a map of the worksite, such as a vegetative index map, or another type of agricultural characteristic map, and by obtaining sensed biomass values (e.g., from biomass sensor 225) and determining a relationship between the values in the obtained map and the sensed biomass values, corresponding to the same location on the worksite. The determined relationship, in combination with the obtained map, is used to generate a predictive biomass map that provides predictive biomass values at different locations at the worksite based on the values in the obtained map at those locations and the determined relationship. In other examples, biomass map 1412, and the values therein, can be obtained in various other ways.

It will be understood that crop constituent map 1410 and biomass map 1412 are "flat" maps in that the values therein are distributed at x, y locations. That is, maps 1410 and 1412 shows values at various x, y positions on the worksite. As will be discussed in greater detail, predictive model generator 342 generates a predictive model that distributes values along the z axis at those various x, y locations to generate a predictive vertical crop constituent distribution model and map.

A priori vertical crop constituent distribution data 1414 includes crop constituent values and yield (e.g., tonnage) values distributed along a length of the crop plant. A priori vertical crop constituent distribution data 1414 can be provided by seed companies that conduct testing of crops resulting from their produced seeds. A priori vertical crop constituent distribution data 1414 can be provided by other expert knowledge, such as testing conducted by universities or other research institutions. A priori crop constituent distribution data 1414 can include historical constituent distributions, such as constituent distributions of crop harvested in previous seasons. A priori crop constituent distribution data 1414 can include constituent distributions of crop as determined from lab testing selective samples at the worksite, or another worksite, such as worksite with similar genotype characteristics. A priori vertical crop constituent distribution data 1414 can show crop constituent values and tonnage values at multiple elevation zones (e.g., cut heights). For example, a priori vertical crop constituent distribution data 1414 can show that for a corn plant of 2 meters (m), cut at 10 cm above the worksite, the starch value is 28%, the fiber value is 22%, and the resultant tonnage value is 600 grams, whereas at a cut height of 20 cm the starch value is 30%, the fiber value is 20%, and the resultant tonnage value is 540 grams. These are merely examples. As will be discussed in greater detail, a priori vertical crop constituent distribution data 1414 provides reference values for modeling a vertical crop constituent distribution at the worksite.

As agricultural harvester 100 operates at the worksite in-situ sensors 206 generate in-situ data 1416 for crop cut and processed by agricultural harvester 100 that correspond to given locations on the worksite. For a given location at the worksite, as indicated by geographic location data 1417, agricultural harvester 100 provides in-situ data 1416 that indicates a height of the crop at that location (as derived from crop height sensors 224), a height at which the crop at the location was cut (as derived from header height sensors 1404), crop constituent values of crop material resulting from crop at that location (as derived from crop constituent sensors 222), crop moisture values of crop material resulting from crop at that location (as derived from crop moisture sensors 227), and crop biomass values of crop material resulting from crop at that location (as derived from biomass sensors 225). It will be understood that in-situ data 1416 can also include yield (e.g., tonnage) values of the crop material resulting from crop at that location, the tonnage values can be derived from one or more of the cut height, crop height, biomass of the crop material, and moisture of the crop material. For example, knowing the height of the crop, the height at which the crop was cut, the moisture of the cut crop gathered by the machine, and the biomass of the processed crop, a tonnage value of the harvested crop material can be derived. In this way, predictive model generator 342 is provided with in-situ crop constituent values and tonnage values at a given elevation zone (cut height) for crop of a given height at the worksite.

Predictive model generator 342 includes predictive vertical crop constituent distribution model generator 1418 and can include other items 1419, such as other model generators. Predictive vertical crop constituent distribution model generator 1418 predictively distributes the in-situ values (e.g., in-situ crop constituent values and tonnage values) along the length of the crop at the location to generate a predictive vertical crop constituent distribution for the crop at that location. Generating the predictive vertical crop constituent distribution can include modeling, such as a mathematical function of cut height, that is, constituent and tonnage values=f(cut height). Predictive model generator 342 can also utilize a table, a matrix, a set of rules, a neural network, as well as other machine learning, in generating the predictive vertical crop constituent distribution. Generating the predictive vertical crop constituent distribution can include estimating a change in the crop constituent values and tonnage values as the cut height moves along the length of the crop plant. The in-situ values provided by in-situ data 1416 provide measured values at a given cut height. The estimated change can be based on a historical data (such as historical in-situ values from previous operations), or expert knowledge, such as a priori vertical crop constituent distribution data 1414, or both. As the agricultural harvester 100 continues to provide more in-situ values throughout the operation, the estimated change will become more accurate.

In any case, predictive vertical crop constituent distribution model generator 1418 models a relationship between the predictive vertical crop constituent distribution for a given location or the values provided by in-situ data 1416, or both, and the one or more values in the one or more obtained maps (crop constituent map 1410 and biomass map 1412) at that same location at the worksite to generate a predictive vertical crop constituent distribution model 1420.

Predictive map generator 352 includes predictive 3D vertical crop constituent distribution map generator 1422 and can include other items 1423, such as other map generators. Predictive 3D vertical crop constituent distribution map generator 1422 obtains predictive vertical crop constituent distribution model 1420 and one or more of the obtained maps (crop constituent map 1410 and 1412) and generates a functional predictive 3D vertical crop constituent distribution map 1430 that includes predictive crop constituent values and predictive yield (e.g., tonnage values) at multiple elevation zones (e.g., cut heights) at various locations at the worksite, based on the predictive vertical crop constituent distribution model 1420 and the one or more values from the one or more obtained maps at those various locations at the worksite.

The functional predictive 3D vertical crop constituent distribution map 1430 can be provided to control zone generator 313, control system 204, or both. Control zone generator 313 generates control zones and incorporates those control zones into the functional predictive 3D vertical crop constituent distribution map 1430 to produce a functional predictive 3D vertical crop constituent distribution map with control zones 1440. One or both of predictive map 1430 or predictive map with control zone 1440 can be presented to an operator 244 or user 246 or be provided to control system 204, which generates control signals to control one or more of the controllable subsystems 208 (such as header subsystem 236) based upon the predictive map 1430, the predictive map with control zones 1440, or both.

As agricultural harvester 100 continues to operate at the worksite, predictive model generator 342 and predictive map generator 352 can dynamically update the predictive model 1420 and the predictive map 1430 throughout the operation, based on further in-situ values generated by in-situ sensors 206. For example, there may be a difference between in-situ crop constituent values and in-situ tonnage values for a given location and the predictive crop constituent values and predictive tonnage values for that location, as provided by the current predictive map 1420. Based on this difference, predictive model generator 342 can dynamically update the predictive model 1420 and predictive map generator 352 can update the predictive map 1430 based on the updated predictive model 1420. The updated predictive map 1430 can be provided to control zone generator 313, control system 204, or both. Control zone generator 313 generates control zones and incorporates those control zones into the updated functional predictive 3D vertical crop constituent distribution map 1430 to produce an updated functional predictive 3D vertical crop constituent distribution map with control zones 1440. One or both of updated predictive map 1430 or updated predictive map with control zone 1440 can be presented to an operator 244 or user 246 or be provided to control system 204, which generates control signals to control one or more of the controllable subsystems 208 (such as header subsystem 236) based upon the predictive map 1430, the predictive map with control zones 1440, or both.

Figure 5A:
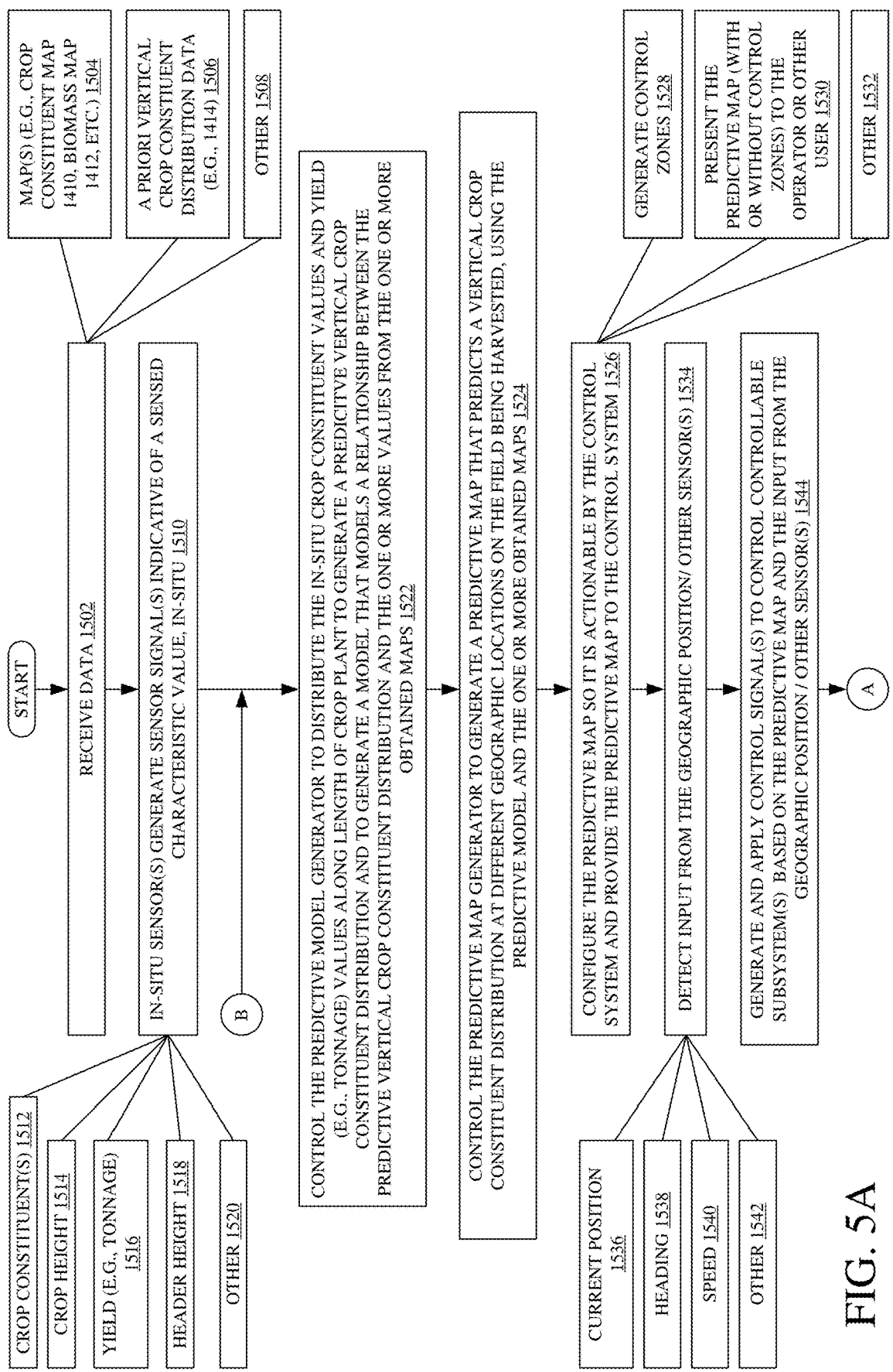
FIGS. 5A-5B is a flow diagram showing one example operation of a predictive model generator and a predictive map generator.
Figure 5B:
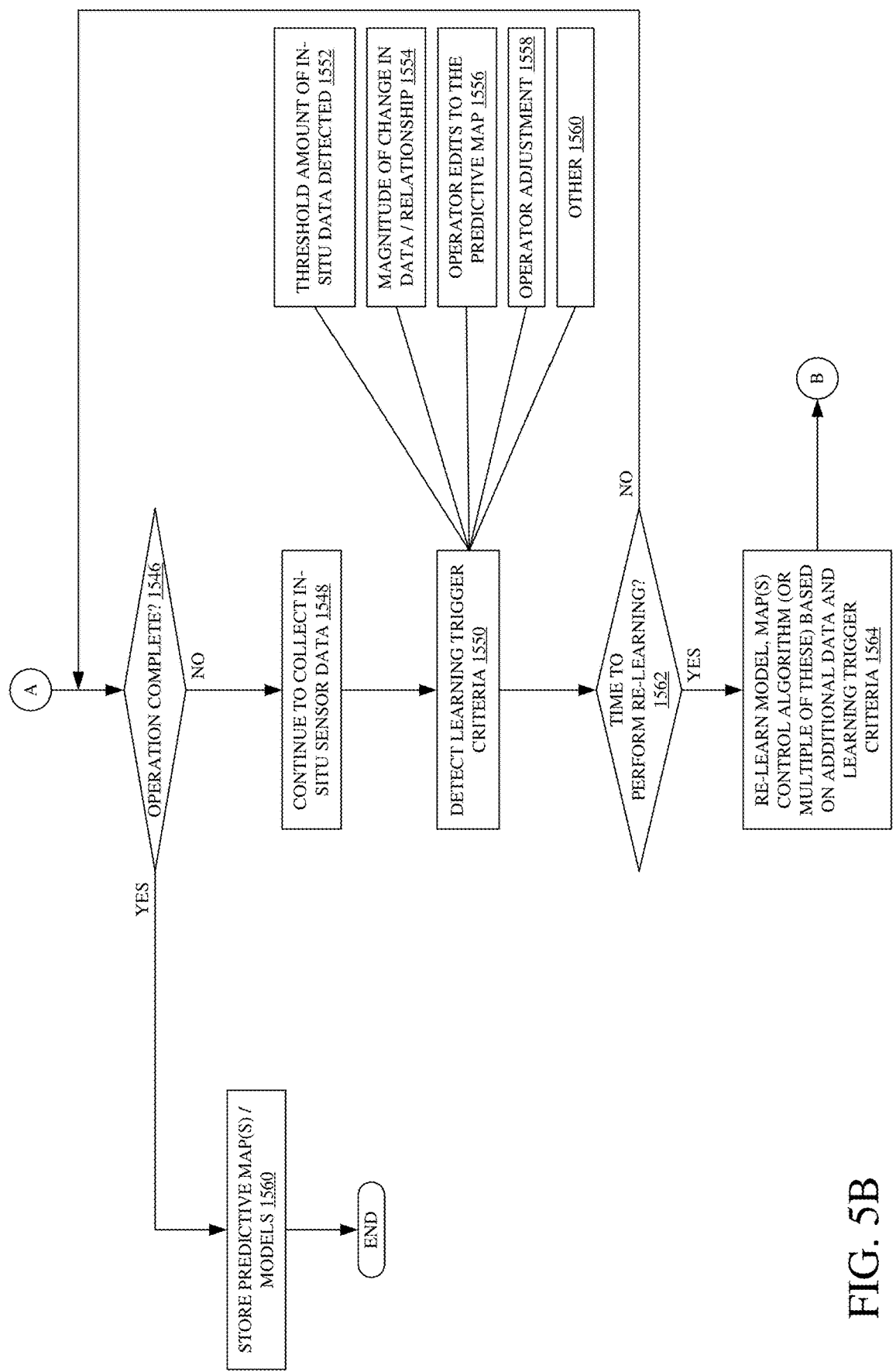

FIGS. 5A and 5B (collectively referred to herein as FIG. 5) show a flow diagram illustrating one example of the operation of agricultural system 200 in generating a predictive model, such as predictive vertical crop constituent distribution model 1420, and a predictive map, such as functional predictive 3D vertical crop constituent distribution map 1430.

At block 1502, agricultural system 200 obtains one or more data items. As indicated by block 1504, the one or more data items can include one or more maps, such as one or more of crop constituent map 1410, biomass map 1412, and various other agricultural characteristic maps. As indicated by block 1506, the one or more data items can include a priori vertical crop constituent distribution data, such as a priori vertical crop constituent distribution data 1414. The one or more data items can include various other data as well, as indicated by block 1508.

At block 1510, in-situ sensors 206 generate sensor signals indicative of sensed characteristics values, such as in-situ crop constituent values generated by crop constituent sensors 322, as indicated by block 1512, in-situ crop height values generated by crop height sensors 1402, as indicated by block 1514, in-situ yield (e.g., tonnage) values as derived from one or more of biomass values generated by biomass sensors 225 and crop moisture values generated by crop moisture sensors 227, as indicated by block 1516, in-situ header height values generated by header height sensors 1404, as indicated by block 1518, as well as various other in-situ characteristic values, as indicated by block 1520.

At block 1522, predictive model generator 342 controls the predictive vertical crop constituent distribution model generator 1418 to generate a predictive vertical crop constituent distribution for crop at a location of the worksite corresponding to the in-situ values by estimating a change in the in-situ values along the length of the crop plant and distributing the in-situ values along the length of the crop plant based on the estimated change. Predictive vertical crop constituent distribution model generator 1418 then generates a predictive vertical crop constituent distribution model 1420 that models a relationship between the predictive vertical crop constituent distribution and the one or more values from the one or more obtained maps.

At block 1524, the relationship or model (e.g., model 1420) is obtained by predictive 3D vertical crop constituent distribution map generator 1422. Predictive 3D vertical crop constituent distribution map generator 1422 generates a functional predictive 3D vertical crop constituent distribution map 1430 that provides predictive crop constituent values at predictive yield (e.g., tonnage) values at multiple elevation zones (e.g., cut heights) at different geographic location in the field being harvested based on the relationship or model and the one or more values from the one or more obtained maps at those different locations.

At block 1526, predictive map generator 352 configures the predictive map 1430 so that the predictive map 1430 is actionable (or consumable) by control system 204. Predictive map generator 352 can provided the predictive map 1430 to the control system 204 or to control zone generator 313 or both. For example, predictive map generator 352 configured predictive map 1430 so that predictive map 1430 includes values that can be read by control system 204 and used as the basis for generating control signals for one or more of the different controllable subsystems of the agricultural harvester 100.

For instance, as indicated by block 1528, control zone generator 313 can divide the predictive map 264 into control zones based on the values on the predictive map 264. Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system 204, the controllable subsystems 208, based on wear considerations, or on other criteria.

At block 1530, predictive map generator 352 configures predictive map 1430 or the predictive with control zones 1440 for presentation to an operator or other user. When presented to an operator or other user, the presentation of the predictive map 1430 or predictive map with control zones 1440 or both may contain one or more of the predictive values on the predictive map 1430 correlated to geographic locations, the control zones on predictive map with control zones 1440 correlated to a geographic locations, and settings values or control parameters that are used based on the predicted values on predictive map 1430 or zones on predictive map with control zones 1440. The presentation can, in another example, include more abstracted information or more detailed information. The presentation can also include a confidence level that indicates an accuracy with which the predictive values on predictive map 1430 or the zones on predictive map with control zones 1440 conform to measured values that may be measured by sensors on agricultural harvester 100 as agricultural harvester 100 moves through the field. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display markers are visible on the physical display device and which values the corresponding person may change. As an example, a local operator of agricultural harvester 100 may be unable to see the information corresponding to the predictive map 1430 or make any changes to machine operation. A supervisor, such as a supervisor at a remote location, however, may be able to see the predictive map 1430 on the display but be prevented from making any changes. A manager, who may be at a separate remote location, may be able to see all of the elements on predictive map 1430 and also be able to change the predictive map 1430. In some instances, the predictive map 1430 accessible and changeable by a manager located remotely may be used in machine control. This is one example of an authorization hierarchy that may be implemented. The predictive map 1430 or predictive map with control zones 1440 or both can be configured in other ways as well, as indicated by block 1532.

At block 1534, input from one or more geographic position sensors 226 and other in-situ sensors 206 are received by the control system 204. Particularly, at block 1536, control system 2004 detects an input from a location sensor 230 identifying a geographic location of agricultural harvester 100. Block 1538 represents receipt by the control system 204 of sensor inputs from heading/speed sensors 232 indicative of trajectory or heading of agricultural harvester 100, and block 1540 represents receipt by the control system 204 of sensor inputs from heading/speed sensors 232 indicative of a speed of agricultural harvester 100. Block 1542 represents receipt by the control system 204 of other information from various in-situ sensors 206.

At block 1544, control system 204 generates control signals to control the controllable subsystems 208 based on the predictive map 1430 or the predictive map with control zones 1440, or both, and the input from the geographic position sensors 226 and any other in-situ sensors 206. Control system 204 then applies the control signals to the controllable subsystems 208. It will be appreciated that the particular control signals that are generated, and the particular controllable subsystems 208 that are controlled may vary based upon one or more different things. For example, the control signals that are generated and the controllable subsystems 208 that are controlled may be based on the type of predictive map 1430 or predictive control zone map 1440 or both that is being used. Similarly, the control signals that are generated and the controllable subsystems 208 that are controlled and the timing of the control signals can be based on various latencies of crop flow through the agricultural harvester 100, the responsiveness of the controllable subsystems, the speed at which the agricultural harvester 100 is traveling, etc.

At block 1546, a determination is made as to whether the harvesting operation has been completed. If harvesting is not completed, the processing advances to block 1548 where in-situ sensor data from geographic position sensors 226 and in-situ sensors 206, such as crop constituent sensors 222, crop height sensors 1402, header height sensors 1404, biomass sensors 225, and crop moisture sensors 227 (and perhaps other sensors) continue to be read.

In some examples, at block 1550, agricultural system 200 can also detect learning trigger criteria to perform machine learning on one or more of the predictive map 1430, predictive map with control zones 1440, the predictive model 1420 generated by predictive model generator 342, the zones generated by control zone generator 313, one or more control algorithms implemented by the controllers in the control system 204, and other triggered learning.

The learning trigger criteria can include any of a wide variety of different criteria. Some examples of detecting trigger criteria are discussed with respect to blocks 1552, 1554, 1556, 1558, and 1560. For instance, in some examples, triggered learning can involve recreation of a relationship used to generate a predictive model when a threshold amount of in-situ sensor data 1416 are obtained from in-situ sensors 206. In such examples, receipt of an amount of in-situ sensor data 1416 from the in-situ sensors 206 that exceeds a threshold trigger or causes the predictive model generator 342 to generate a new predictive model that is used by predictive map generator 352. Thus, as agricultural harvester 100 continues a harvesting operation, receipt of the threshold amount of in-situ sensor data 1416 from the in-situ sensors 206 triggers the creation of a new (e.g., updated) relationship represented by a new (e.g., updated) predictive model 1420 generated by predictive model generator 342. Further, a new (e.g., updated) predictive map 1430, a new (e.g., updated) predictive map with control zones 1440, or both can be regenerated using the new (e.g., updated) predictive model. Block 1552 represents detecting a threshold amount of in-situ sensor data used to trigger creation of a new predictive model.

In other examples, the learning trigger criteria may be based on how much the in-situ sensor data 1416 from the in-situ sensors 206 are changing, such as over time or compared to previous values. For example, if variations within the in-situ sensor data 1416 (or the relationship between the in-situ sensor data 1416 and the information in the one or more obtained maps) are within a selected range or is less than a defined amount, or below a threshold value, then a new predictive model is not generated by the predictive model generator 342. As a result, the predictive map generator 352 does not generate a new predictive map 1430, a new predictive map with control zones 1440, or both. However, if variations within the in-situ sensor data 1416 are outside of the selected range, are greater than the defined amount, or are above the threshold value, for example, then the predictive model generator 342 generates a new predictive model using all or a portion of the newly received in-situ sensor data 1416 that the predictive map generator 352 uses to generate a new predictive map 1430, a new predictive map with control zones 1440, or both. At block 1556, variations in the in-situ sensor data 1416, such as a magnitude of an amount by which the data exceeds the selected range or a magnitude of the variation of the relationship between the in-situ sensor data 1416 and the information in the one or more obtained maps, can be used as a trigger to cause generation of a new predictive model and new predictive map or new predictive map with control zones, or both. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 342 switches to a different obtained map (different from the originally selected obtained map), then switching to the different obtained map may trigger re-learning by predictive model generator 342, predictive map generator 352, control zone generator 313, control system 204, or other items. In another example, transitioning of agricultural harvester 100 to a different topography or to a different control zone may be used as learning trigger criteria as well.

In some instances, an operator 244 or user 246 can also edit the predictive map 1430 or predictive map with control zones 1440 or both. The edits can change a value on the predictive map 1430, change a size, shape, position, or existence of a control zone on predictive map with control zones 1440, or both. Block 1556 shows that edited information can be used as learning trigger criteria.

In some instances, it may also be that operator 244 or user 246 observes that automated control of a controllable subsystem 208, is not what the operator 244 or user 246 desires. In such instances, the operator 244 or user 246 may provide a manual adjustment to the controllable subsystem 208 reflecting that the operator 244 or user 246 desires the controllable subsystem 208 to operate in a different way than is being commanded by control system 204. Thus, manual alteration of a setting by the operator 244 or user 246 can cause one or more of predictive model generator 342 to relearn a model, predictive map generator 352 to regenerate map 1430, control zone generator 313 to regenerate one or more control zones on predictive map with control zones 1440, and control system 204 to relearn a control algorithm or to perform machine learning on one or more of the controller components in control system 204 based upon the adjustment by the operator 244 or user 246, as shown in block 1558. Block 1560 represents the use of other triggered learning criteria.

In other examples, relearning may be performed periodically or intermittently based, for example, upon a selected time interval such as a discrete time interval or a variable time interval, as indicated by block 1562.

If relearning is triggered, whether based upon learning trigger criteria at block 1550 or based upon passage of a time interval, as indicated by block 1562, then one or more of the predictive model generator 342, predictive map generator 352, control zone generator 313, and control system 204 performs machine learning to generate a new predictive model, a new predictive map, a new control zone, and a new control algorithm, respectively, based upon the learning trigger criteria. The new predictive model, the new predictive map, and the new control algorithm are generated using any additional data that has been collected since the last learning operation was performed. Performing relearning is indicated by block 1564.

If the harvesting operation has been completed, operation moves from block 1546 to block 1560 where one or more of the predictive map 1430, predictive map with control zones 1440, and predictive model 1420 are stored. The predictive map 1430, predictive map with control zones 1440, and predictive model 1420 may be stored locally on data store 210 or sent to a remote system using communication system 209 for later use.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or the same worksite at a future time.

The revision of the model in response to new data may employ machine learning methods. Without limitation, machine learning methods may include memory networks, Bayes systems, decisions trees, Eigenvectors, Eigenvalues and Machine Learning, Evolutionary and Genetic Algorithms, Cluster Analysis, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value (e.g., detected vertical crop constituent value) varies from a predictive value of the characteristic (e.g., predictive vertical crop constituent value), such as by a threshold amount. This deviation may only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation cross the threshold are used to generate a linear equation. The linear equation is used to adjust the predictive characteristic value in unharvested areas of the worksite in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as one or more of a crop constituent map (e.g., historical or predictive), a biomass map, and another type of map.

In-situ sensors generate sensor data indicative of in-situ characteristic values, such as in-situ crop constituent values at given cut heights.

A predictive model generator generates one or more predictive models based on the one or more obtained maps and the in-situ sensor data, such as a predictive vertical crop constituent distribution model.

A predictive map generator generates one or more functional predictive maps based on a model generated by the predictive model generator and the one or more obtained maps. For example, the predictive map generator may generate a functional predictive 3D vertical crop constituent distribution map that maps predictive crop constituent values at two or more cut height to one or more locations on the worksite based on a predictive vertical crop constituent distribution model and the one or more obtained maps.

Control zones, which include machine settings values, can be incorporated into the functional predictive 3D vertical crop constituent distribution map to generate a functional predictive 3D vertical crop constituent distribution map with control zones.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained maps. The functional predictive maps or the functional predictive control zone maps, or both, are then revised based on the revised model(s) and the values in the obtained maps.

Figure 6:
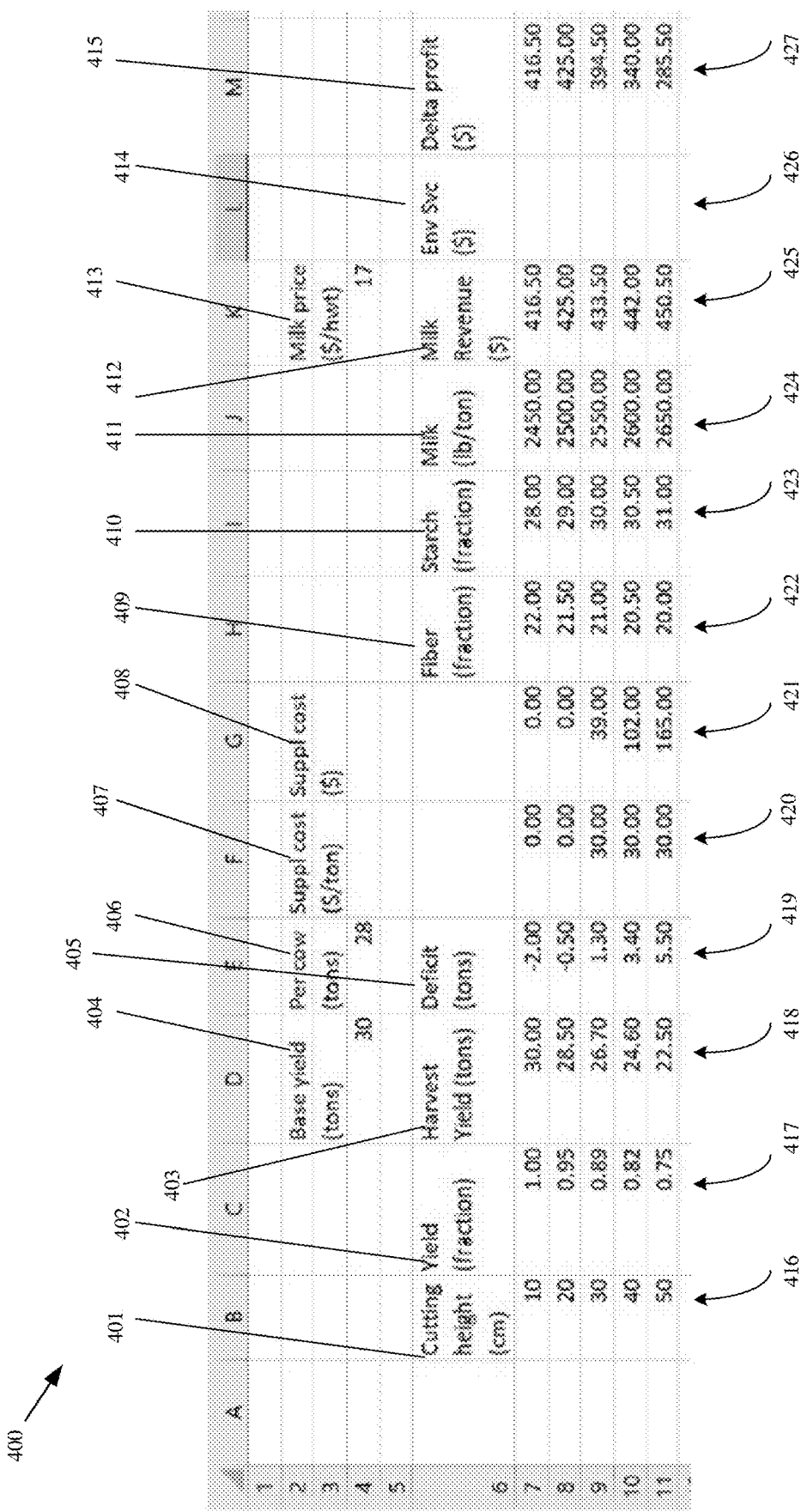
FIG. 6 is a pictorial illustration showing one example of a constituent cost model.

FIG. 6 is a pictorial illustration showing one example of a constituent cost model 400 that can be generated and executed by constituent cost logic 422. The constituent cost model shown in FIG. 6 is a simplified version of a cost model that looks at a single dairy cow and a single worksite (e.g., a single field) for ease of description. It will be understood that the cost model shown in FIG. 6 can be used across multiple worksites (e.g., fields) and multiple livestock. Model 500 includes cutting height 401, yield percentage 402, harvested yield total 403, available yield 404, yield unit deficit 405, goal yield 406, supplemental feed unit cost 407, supplemental feed total cost 408, constituent 409, constituent 410, milk production total 411, milk revenue 412, milk unit price 413, other costs 414, profit 415, cutting height values 416, yield percentage values 417, harvested yield total values 418, yield unit deficit values 419, supplemental feed unit cost values 420, supplemental feed total cost values 421, constituent values 422, constituent values 423, milk production total values 424, milk revenue values 425, other costs values 426, and profit values 427. It will be understood that while constituent 409 corresponds to fiber and constituent 410 correspond to starch, other constituents can be considered. Further, while only two constituents are shown, it will be understood that model 500 can consider more or less constituents, such as one or more of starch, carbohydrates, oil, protein, sugar, fiber, such as lignan, as well as various other crop constituents, for instance, minerals, pathogens, and contaminants. For the sake of example, but not by limitation, constituent 409 will be referred to as fiber 409 and constituent 410 will be referred to as starch 410, while constituent values 422 will be referred to as fiber values 422 and constituent values 423 will be referred to as starch values 423.

Cutting height values 416 represent various heights at which crop can be cut by a header on a mobile machine, such as header 108 on forage harvester 100. While cutting height values 416 are illustratively shown as 10 centimeters (cm), 20 cm, 30 cm, 40 cm, and 50 cm, in other examples various other cutting heights as well as more or less cutting heights can be used. Yield percentage values 417 represent various estimated yield percentage values at the corresponding cut height. The yield percentage values 417 illustratively represent the percentage of the total available yield 404 that will be harvested at the corresponding cut height. The predicted value of yield that will be harvested is illustratively represented by yield total values 418 which represent a tonnage total. The available yield 404 is illustratively 30 tons in the example of FIG. 6. Thus, in the example of a cut height of 10 cm, it is estimated that the harvested yield total value 418 will be 30 tons of a total available yield of 30 tons and thus the yield percentage value 417 is 100%. In the example of a cut height of 50 cm, it is estimated that the harvest yield total value 418 will be 22.5 tons of a total available yield of 30 tons and thus the yield percentage value 417 is 75%. As can be seen in FIG. 6, as the cut height values 416 increase, the corresponding yield total values 418 decrease This is due to more of the crop plant being left on the worksite, rather than being processed by the mobile machine. The estimated values of total yield and estimated harvested yield can be derived from various data sources, such as maps of the field, such as yield maps, biomass maps, crop height maps, etc., historical values of yield, such as historical values from previous operations, typical yield values, expert knowledge, data provided by a seed producer, as well as various other data.

Yield deficit values 419 illustratively represent a tonnage deficit resulting from the difference between estimated harvested yield, as represented by harvested yield total values 418, and the goal yield 406, illustratively shown in FIG. 6 as 28 tons. Thus, in the example of a cutting height of 10 cm, there is an estimated surplus of 2 tons, as the result of an estimated harvested yield of 30 tons, 2 tons over the goal of 28 tons. In the example of a cutting height of 50 cm, there is estimated deficit of 5.5 tons, as the result of an estimated harvested yield of 22.5 tons, 5.5 tons less than the goal of 28 tons. The goal yield can be provided by an operator or user, or from various other sources, such as historical yield goals.

Supplemental feed unit cost values 420 illustratively represent a price of supplemental feed, such as supplemental corn silage, per unit (e.g., per ton). The price of supplemental feed can be established based on historical prices, current prices, estimated prices, average prices, etc. The price of supplemental feed can be provided by an operator or user, or derived from another source such as a data store, the Internet, third-party sources, etc. In the example of FIG. 6, the supplemental feed unit cost value 420 is $30 per ton. Thus, the supplemental feed total cost values 421 are a result of the supplemental feed unit cost value 420 and the corresponding yield deficit value 419. Thus, in the example of a cutting height of 10 cm, it is estimated that there will be no cost associated with supplemental feed as there is no estimated yield deficit (surplus of 2 tons at cutting height of 10 cm). In the example of a cutting height of 50 cm, there is an estimated supplemental feed total cost value 421 of $165 as a result of a 5.5-ton yield deficit.

Fiber values 422 and starch values 423 illustratively represent constituent values as percentages of the corresponding harvested yield that comprise the respective constituent. As can be seen in FIG. 6, as the cut height increases the fiber value generally decreases. This is because fiber tends to be in a higher concentration lower in the crop plant. Additionally, as can be seen in FIG. 6, as the cut height increases the starch value generally increases. This is because starch tends to be in higher concentrations higher in the crop plant. Thus, in the example of a cut height of 10 cm, the estimated resultant fiber value 422 is 22% and the estimated resultant starch value 423 is 28% whereas at a cut height of 50 cm, the estimated resultant fiber value 422 is 20% and the estimated resultant starch value 423 is 31%.

Milk production total values 424 illustratively represent the estimated resultant total milk production in pounds (lbs.). As previously discussed, starch generally assists in the production of milk. Thus, in FIG. 6, it can be seen that the milk production total values 424 generally increase in feed with higher starch values. In the example of a cut height of 10 cm in which the resultant feed has a starch value 423 of 28% the estimated resultant milk production total value 424 is 2450 lbs. whereas in the example of a cut height of 50 cm in which the resultant feed has a starch value 423 of 31% the estimated resultant milk production total value 424 is 2650 lbs.

Milk revenue values 425 illustratively represent an estimated resultant revenue, in dollars. The milk revenue values 425 are a result of the corresponding estimated resultant milk production total value 424 and the milk unit price 413. In the example of FIG. 6, the milk unit price 413 is illustratively represented as a dollar value per hundredweight (hwt) of milk. The milk unit price 413 can be established based on historical prices, current prices, estimated prices, average prices, etc. The milk unit price can be provided by an operator or user, or obtained from another source, such as a data store, the Internet, or a third-party source. At the cut height of 10 cm in which the estimated resultant milk production total value 424 is 2450 lbs. the estimated resultant milk revenue value 425 is $416.50. In the example of a cut height of 50 cm, in which the estimated resultant milk production total value 424 is 2650, the estimated resultant milk revenue value is $450.50.

Other costs values 426 illustratively represent an estimated total sum, in dollars, of other costs that can be accounted for, such as overhead costs, production costs, cost offsets, as well as various other costs. While there are no values illustrated as other cost values 426 in FIG. 6, it is to be understood that in other examples, values can be accounted for. For instance, an operator or user can provide values of other costs 426. Additionally, it should be understood that other costs values 426 can also account for cost offsets, such as additional revenue as a result of the harvesting operation, for instance, potential revenue from surplus feed (e.g., 2-ton surplus of feed at 10 cm cutting height could result in $60 revenue), as well as potential revenue and/or cost offsets for environmental considerations (this will be discussed in further detail below).

Profit values 427 illustratively represent an estimated resultant profit, in dollars. The estimated resultant profit values 427 are the result of the corresponding estimated resultant milk revenue value 425 less the corresponding other cost value 426 and the supplemental feed total cost values 421. As there are no values provided in FIG. 6 for other costs values 426, the profit values 427 are the same as the corresponding estimated resultant milk revenue values 425 minus any supplemental feed total cost values 421. For the sake of illustration, in the example of a cut height of 50 cm, in which the estimated resultant milk revenue value 425 is $450.50 and the supplemental feed total cost value 421 is $165.00, the corresponding estimated resultant profit value 427 is $285.50. This is an example only.

As can be seen, constituent cost logic 422 can output a model, such as model 400, as well as various values derived from the model. Header position setting analyzer 318 can provide a header position setting based on the model, or values thereof, output by constituent cost logic 422 for the control of header 108. For example, header position setting analyzer 318 can output a header position setting corresponding to cut height of the model based on one or more values provided by the model, for instance, a header position setting based on an estimated resultant yield (e.g., 418), based on an estimated resultant yield deficit (e.g., 419), based on an estimated resultant supplemental feed cost (e.g., 421), based on an estimated resultant constituent value (e.g., 422, 423), based on an estimated resultant milk production (e.g., 424), based on an estimated resultant milk revenue (e.g., 425), based on an estimated resultant profit value (e.g., 427), or some combination of values. In some examples, an operator or user can provide the parameters by which header position setting analyzer 318 is to identify a header position setting, for instance, an operator or user may direct header position setting analyzer 318 to identify a header position setting to optimize, maximize, or minimize one or more of the values provided by the constituent cost function model. For instance, a user or operator can direct header position setting analyzer 418 to identify a header position setting to maximize estimated resultant yield (e.g., 418) or to maximize estimated resultant profit value (e.g., 427). In another example, a user or operator can direct header position setting analyzer 418 to optimize one or more values, for instance to optimize estimated resultant yield (e.g., 418) and estimated resultant profit value (e.g., 427) given some other criteria, such as a maximum fiber value of 21.9%, and thus, in the example of FIG. 6, header position setting analyzer 418 identifies a header position setting corresponding to a cut height of 20 cm. In another example, a user or operator can direct header position setting analyzer to minimize one or more values, for instance to minimize estimated resultant supplement feed total cost values (e.g., 421) and thus, in the example of FIG. 6, header position setting analyzer 418 identifies a header position setting corresponding to a cut height of 10 cm or 20 cm. These are merely some examples.

Figure 7:
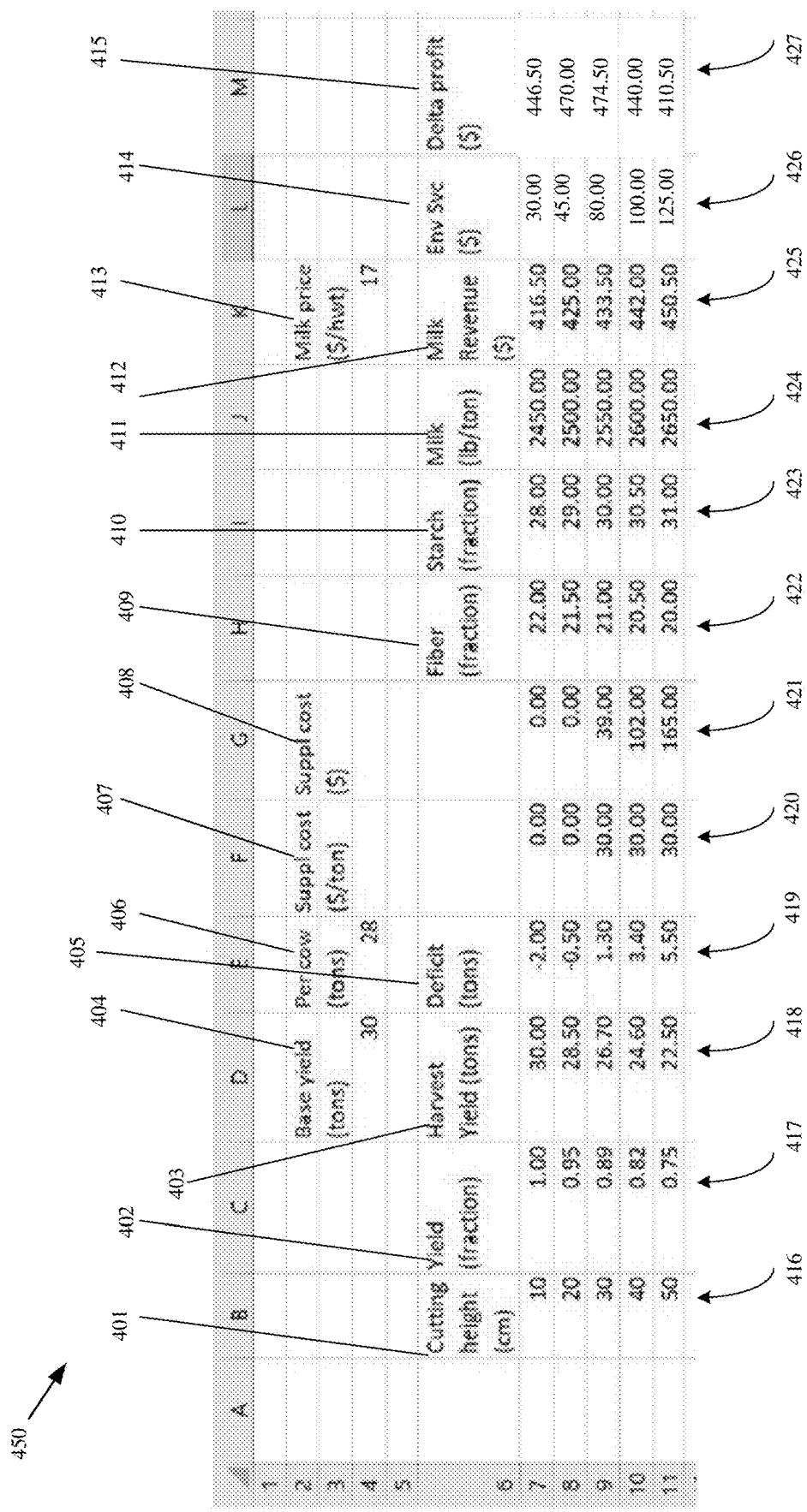
FIG. 7 is a pictorial illustration showing one example of an environmental cost model.

FIG. 7 is a pictorial illustration showing one example of an environmental cost model 450 that can be generated and executed by environmental cost logic 423. Model 450 is similar to model 400 and thus similar items are numbered similarly. The difference between environmental cost model 450 and constituent cost model 400 is that environmental considerations (e.g., costs) have been taken into account, as represented by other costs values 426 and the estimated resultant profit values 426 in FIG. 7 have been accordingly adjusted, as compared to the estimated resultant profit values 426 in FIG. 6. Presently or in the future, there may be environmental revenues to be gained based on certain agricultural practices. In the example of forage harvesting, a carbon credit, such as an adherence payment, tax deduction, etc., can result from soil carbon sequestration of stubble (or crop residue) left in the field as a function of the cutting height. Additionally, in the example of a livestock operation (e.g., dairy cattle, beef cattle, as well as various other livestock), credit, such as an adherence payment, tax deduction, etc. can result from reduced methanogenesis based on a reduced fiber, higher starch diet. While various other environmental considerations can also be included as part of model 450, FIG. 7 proceeds with the example of carbon credit and methanogenesis. It will also be noted that the values representing other costs values 426 are arbitrary and used for example only.

Thus, in the example of a cut height of 10 cm, there is an estimated resultant other cost 426 of $30 surplus as a result of carbon credit and/or reduced methanogenesis and thus, the corresponding estimated resultant profit value 427 has been adjusted up from $416.50 (as shown in FIG. 6) to $446.50. Of note in FIG. 7, is that the cut height of 30 cm now has a greater corresponding estimated resultant profit value 427 than the estimated resultant profit value 427 corresponding to the cut height of 20 cm (the greatest profit value 427 in FIG. 6). This could be due to the greater amount of stubble (or other residue) left on the worksite at a cut height of 30 cm as compared to the amount of stubble (or other residue) left on the worksite at a cut height of 20 cm and/or the reduced fiber value 409 in the resultant feed at the cut height of 30 cm as compared to the fiber value 409 corresponding to the cut height of 20 cm. Accounting for environmental costs can result in a different header position setting being identified by header position setting analyzer 318. For example, when maximizing profit, header position setting analyzer 318, using model 400, will identify a cut height of 20 cm, whereas header positing setting analyzer 318, using model 450, will identify a cut height of 30 cm. These are merely some examples.

Figure 8:
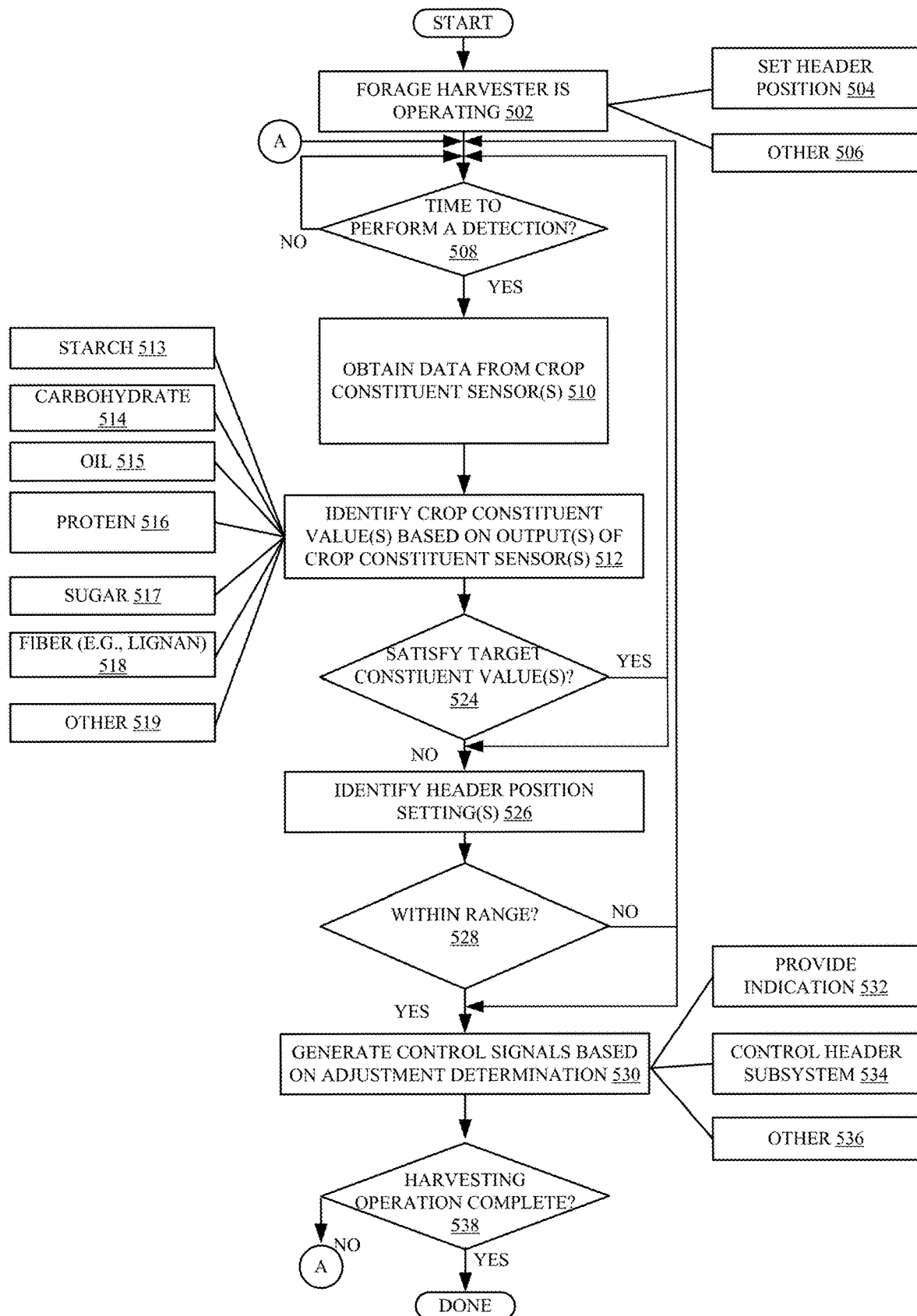
FIG. 8 is a flow diagram showing one example operation of a control system in controlling the operation of an agricultural harvesting machine.

FIG. 8 is a flow diagram showing an example of the operation of the control system shown in previous figures in controlling the operation of a mobile machine, such as mobile agricultural machine 100. It is to be understood that the operation can be carried out at any time or at any point through an agricultural operation. Further, while the operation will be described in accordance with mobile agricultural machine 100, it is to be understood that other machines with a control system 204 can be used as well.

It is first assumed that mobile agricultural machine 100 is operating or is operational. This is indicated by block 502. In some examples, initial machine settings have been set, such as header position settings, as indicated by block 504, as well as various other machine settings, as indicated by block 506. Mobile machine 100 can be operating in other ways as well.

At some point, control system 204 determines whether it is time to perform a detection operation in order to detect crop constituent values. This is indicated by block 508. This can be done in a wide variety of different ways. For instance, it may be that the crop constituent detection is continuously performed or is detected at periodic intervals, such as time-based intervals, distance traveled intervals, etc. In another example, it may be that crop constituent detection is performed only when certain criteria are detected, such as a change in machine performance, a change in worksite conditions, as well as various other criteria. In another example, crop constituent values may be continuously detected, and can, in some examples, be aggregated to generate an aggregated crop constituent value. In such an example, it may be that the control system 204 only periodically samples or obtains the detected values and/or aggregated values.

Once it is determined that detection operation is to be performed at block 508, then sensor signals from crop constituent sensors 222 are obtained by control system 204, as indicated by block 510.

Processing proceeds at block 512 where the obtained sensor signals are processed by agricultural characteristic analyzer 214 to identify constituent values of the crop detected by crop constituent sensors 222. Agricultural characteristic analyzer 214 can identify the value (e.g., concentration, amount, percentage, etc.) of one or more constituents in the crop, such as starch values, as indicated by block 513, carbohydrate values, as indicated by block 514, oil values, as indicated by block 515, protein values, as indicated by block 516, sugar values, as indicated by block 517, fiber values, such as lignan values, as indicated by block 518, and/or various other constituent values, such as mineral values, pathogen values, and contaminant values, as indicated by block 519.

Once the one or more crop constituent values are identified at block 512, processing proceeds at block 524 where it is determined if the identified crop constituent value(s) satisfy target (e.g., threshold) crop constituent value(s). In one example, the determination at block 524 includes comparing the identified crop constituent value(s) to target value(s), such as to determine a difference, and based on the difference, it is determined if the identified crop constituent value(s) are satisfactory. In some examples, some threshold range of offset between the identified values and the target values may be allowed, that is, some threshold variance may be deemed acceptable. In one example, if, at block 524, it is determined that the identified constituent value(s) satisfy the target constituent values, then operation of the forage harvester continues until another detection is performed or until the operation is complete. In another example, if, at block 524, it is determined that the identified constituent value(s) satisfy the target constituent values, processing proceeds to block 526 where a new header position setting can be identified by header position setting analyzer 318. For instance, where the identified crop constituent value(s) are deemed satisfactory, it may be that the header position can be adjusted to affect some other characteristic of performance. For example, where a detected starch value is identified as satisfactory, the header may be lowered to increase tonnage.

If, at block 524, it is determined that the identified constituent value(s) do not satisfy the target constituent value(s), processing proceeds to block 526 where header position setting analyzer 318 identifies one or more header position settings to initiate in order to move the current crop constituent value(s), as represented by the identified crop constituent value(s), towards the target crop constituent value(s). For example, header position setting analyzer 318 may, at block 526, determine that the header should be lifted or lowered, relative to the surface of the worksite, by a certain distance in order to obtain desired crop constituent value(s) and/or to move current crop constituent value(s) closer to target crop constituent value(s). For example, as starch in corn plants tends to increase in concentration higher along the length of the corn plant, if the starch values are below the target starch values, header position setting analyzer 318 may determine that the header should be raised and thus identify a header position setting that raises the header.

Processing proceeds at block 528 where it is determined if the header position settings identified by header position setting analyzer 318 are acceptable. For example, a range for header position settings, such as a range of header heights, may be preset, such as by an operator or user, or by control system 204 based on certain criteria, such as desired yield, crop height, etc. For instance, to achieve a desired tonnage, the operator, user, or control system can set a range of header heights that are acceptable in order to achieve the desired tonnage. For example, it may be that the range of header heights are from 10 cm (at a minimum) to 12 cm (at a maximum) above the surface of the worksite. The current header height, at block 524, may be detected (e.g., based on sensor signals from position sensors 223) to be at 10.5 cm above the surface of the worksite. Header position setting analyzer 318 may have recommended lowering the header height by 1 cm and/or setting the header height to 9.5 cm above the surface of the worksite and thus the recommended header position setting is outside the acceptable range of 10 to 12 centimeters above the worksite surface. In a similar example, header position setting analyzer 318 may have recommended raising the header height by 1 cm and/or setting the header height to 11.5 cm above the surface of the worksite and thus the recommended header position setting is within the acceptable range of 10 to 12 inches above the worksite. These are merely examples. In other examples, a range and/or both a minimum and maximum header position (e.g., height, tilt, roll, etc.) may not be used. Instead, only a maximum or minimum header position may be utilized, and thus, at block 528, it may be determined if the identified header setting is above the maximum setting, if not, then the header setting may be adjusted or it may be determined if the identified header setting is below the minimum setting, if not, then the header setting may be adjusted. These are merely some examples.

If, at block 528, it is determined that the identified header position setting(s) are not within an acceptable range, then the mobile machine 100 may continue operating until another detection is performed or until the operation ends. Alternatively, or additionally, processing may proceed to block 530 where control signals may be generated. For instance, it may be that the recommended header position settings are not within the acceptable range or exceed a minimum or maximum, but the header position may be adjusted incrementally in the direction recommended in order to still be within the range or to not exceed a minimum or maximum. In the example above, where it is recommended to lower the header by 1 cm, the header may only be lowered by 0.5 cm, for example, to stay within range while still enacting some form of optimization. In another example, a control signal may be generated to provide an indication of the recommend header position settings, such as by controlling an interface mechanism.

If, at block 528, it is determined that the identified header position settings are within an acceptable range or do not exceed limits, processing proceeds at block 530 where control system generates control signals to control an action of an item of agricultural system architecture 200. As indicated by block 532, a control signal may be generated to control an interface mechanism (e.g., 202, 247, or both) to provide an indication (e.g., display, alert, audio output, haptic output, etc.) of the identified header position setting. The operator or user may then manually adjust the header position setting based on the provided indication. Alternatively, or additionally, as indicated by block 534, a control signal may be generated to control a controllable subsystem 208, such as header subsystem 236 to adjust a position of header 108 based on the identified header position setting, such as by actuating one or more header actuators 123. Various other controls can be implemented, as indicated by block 536.

Processing proceeds at block 538 where it is determined if the agricultural harvesting operation at the worksite is complete. If at block 538 it is determined that the agricultural harvesting operation at the worksite is not complete, processing returns to block 508. If, however, it is determined that the agricultural harvesting operation at the worksite is complete, the operation ends.

Figure 9:
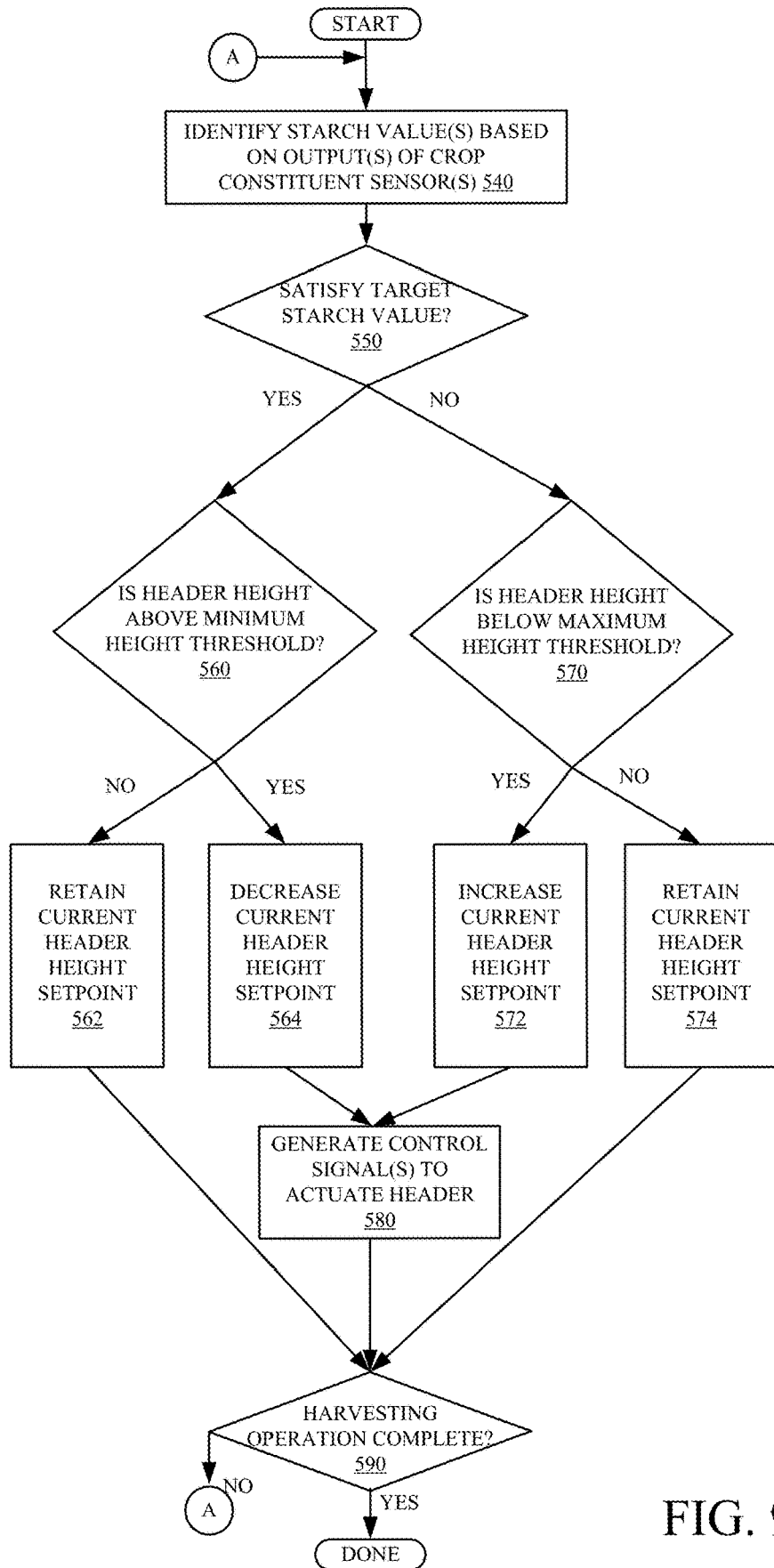
FIG. 9 is a flow diagram showing one example operation of a control system in controlling the operation of an agricultural harvesting machine.

FIG. 9 is a flow diagram showing an example of the operation of the control system shown in previous figures in controlling the operation of a mobile machine, such as mobile agricultural machine 100. It is to be understood that the operation can be carried out at any time or at any point through an agricultural operation. Further, while the operation will be described in accordance with mobile agricultural machine 100, it is to be understood that other machines with a control system 204 can be used as well.

Processing begins at block 540 where the mobile agricultural machine 100 is currently performing a silage harvesting operation. At block 540, starch values of the crop being harvested are detected based on outputs from one or more crop constituent sensors, such as crop constituent sensors 222.

Processing proceeds at block 550 where target logic 320 determines whether the detected starch values satisfy target starch values. In one example, satisfying the target values may include the detected starch value being at or within a threshold distance of the target starch value. In another example, satisfying the target starch value may include the detected starch value being at or exceeding the target starch value. By exceeding it is not necessarily meant that the detected value is of a greater value, but rather, that the detected value is beyond and not merely at the target value. For instance, the target value may comprise a minimum value or a maximum value, and thus, satisfying a minimum value may include detected values being at or above the minimum target value and satisfying a maximum value may include detected values being at or below the maximum target value. These are merely examples.

If, at block 550, it is determined that the detected starch value satisfies the target starch value, processing proceeds at block 560 where header position setting analyzer 318 determines if the current header height is above a minimum height threshold. If, at block 560, it is determined that the current header height is not above the minimum height threshold processing proceeds to block 562 where the current header height setpoint is retained. Processing then proceeds to block 590 where it is determined if the harvesting operation is complete, if so, processing ends, if not, processing returns to block 540 where starch values of crop being harvested continue to be detected.

If, however, it is determined, at block 560, that the current header height is above the minimum height threshold processing proceeds to block 564 where the current header height setpoint is reduced. Processing proceeds to block 580 where control system 204 generates control signals to actuate movement of header 108, such as by actuating actuator(s) 123, based on the reduced header height setpoint to lower the height of header 108. In this way, yield (e.g., tonnage) can be increased by cutting the crop at a lower height along the stalk. Processing proceeds to block 590 where it is determined if the harvesting operation is complete, if so, processing ends, if not, processing returns to block 540 where starch values of crop being harvested continue to be detected.

Returning to block 550, if it is determined that the detected starch values do not satisfy the target starch value, processing proceeds to block 570 where header position setting analyzer 318 determines if the current header height is below a maximum height threshold. If, at block 570, it is determined that the current header height is not below the maximum height threshold processing proceeds to block 574 where the current header height setpoint is retained. Processing then proceeds to block 590 where it is determined if the harvesting operation is complete, if so, processing ends, if not, processing returns to block 540 where starch values of crop being harvested continue to be detected.

If, however, it is determined, at block 570, that the current header height is below the maximum height threshold processing proceeds to block 572 where the current header height setpoint is increased. Processing proceeds to block 580 where control system 204 generates control signals to actuate movement of header 108, such as by actuating actuator(s) 123, based on the increased header height setpoint to raise the height of header 108. In this way, starch values can be increased by cutting the crop at a higher height along the stalk. Processing proceeds to block 590 where it is determined if the harvesting operation is complete, if so, processing ends, if not, processing returns to block 540 where starch values of crop being harvested continue to be detected.

Figure 10:
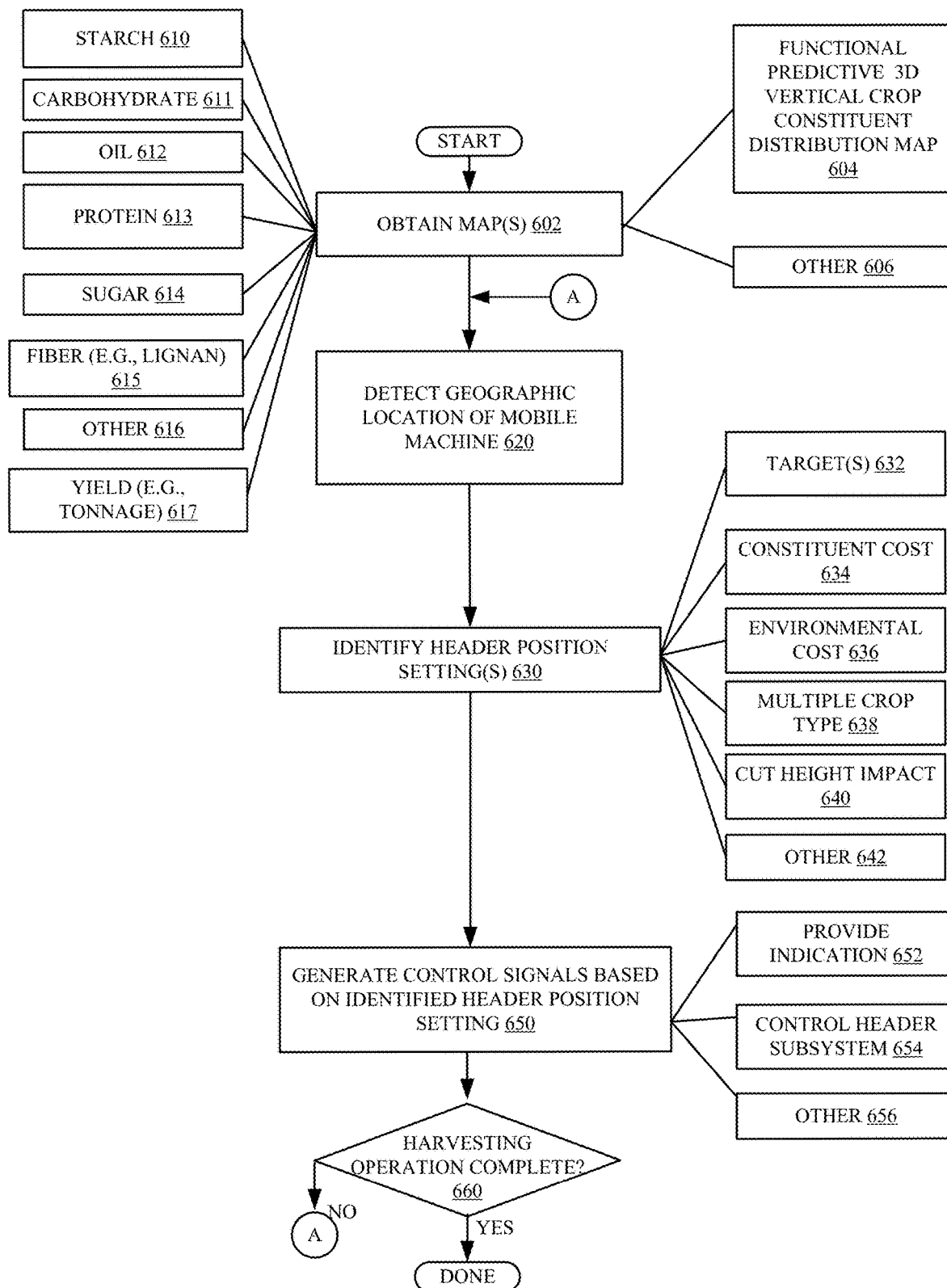
FIG. 10 is a flow diagram showing one example operation of a control system in controlling the operation of an agricultural harvesting machine.

FIG. 10 is a flow diagram showing an example of the operation of the control system 204 shown in previous figures in controlling the operation of a mobile machine, such as mobile agricultural machine 100. It is to be understood that the operation can be carried out at any time or at any point through an agricultural operation, or even if an agricultural operation is not currently underway. Further, while the operation will be described in accordance with mobile agricultural machine 100, it is to be understood that other machines with a control system 204 can be used as well.

At block 602, a map is obtained for use by control system 204 in controlling the operation of forage harvester 100 at a worksite. In one example, the obtained map is a functional predictive 3D vertical crop constituent distribution map, such as map 1430 or map 1440, or both, as indicated by block 604. In other examples, the obtained map is another kind of map, such as another type of map having crop constituent values. The obtained maps can include geolocated predictive values of crop constituents (e.g., concentrations, amounts, percentages, etc.) at various geographic locations across a worksite, including predictive values of crop constituents at multiple elevation zones (e.g., cut heights) at various geographic locations across the worksite. The constituents values represented in the obtained predictive crop constituent map can include starch values, as indicated by block 610, carbohydrate values, as indicated by block 611, oil values, as indicated by block 612, protein values, as indicated by block 613, sugar values, as indicated by block 614, fiber values, such as lignan values, as indicated by block 615, as well as various other values of various other constituents, such as mineral values, pathogen values, and contaminant values, as indicated by block 616. The obtained maps can also include geolocated predictive yield (e.g., tonnage values) of crop at various geographic locations across a worksite, including predictive yield (e.g., tonnage) values at multiple elevation zones (e.g., cut heights) at various geographic locations across the worksite.

At block 620, geographic location information of mobile machine 100 can be obtained. For instance, the geographic location information of mobile machine 100 can be obtained from geographic position sensor(s) 226. The geographic location can include position information of mobile machine 100, including location on the worksite, orientation, and elevation information. The information can also include heading and speed information, such as from heading and speed sensors 232. The geographic location of mobile machine 100 can be obtained in other ways as well.

At block 630, a header position setting for controlling a position of header 108 relative to the worksite is identified by header position setting analyzer 318. In one example, the header position setting is identified based on one or more values (e.g., crop constituent values and tonnage values) in the obtained map. In other examples, the header position setting is identified based on one or more values (e.g., crop constituent values and tonnage values) in the obtained map and one or more criteria. As indicated by block 632, the one or more criteria can include target values, such as header position range(s) or limit(s), target tonnage values, target crop constituent values, target cost values, target profit values, as well as various other targets for one or more operation parameters and/or performance metrics relative to the agricultural operation (e.g., forage harvesting operation). The targets can be input by an operator, such as an operator 244, or can be input by a user, such as a remote user 246. Additionally, the targets can be automatically generated, such as by header position setting analyzer 318. In another example, the targets can be obtained from a data store, such as historical targets, stored in data store 210. The targets can be obtained in various other ways.

As indicated by block 634, the one or more criteria can include output(s) from a constituent cost model, such as output(s) of a constituent cost model implemented by constituent cost logic 322, such as constituent cost model 400.

As indicated by block 636, the one or more criteria can include output(s) from an environmental cost model, such as output(s) of an environmental cost model implemented by environmental cost logic 324, such as environmental cost model 450.

As indicated by block 638, the one or more criteria can include outputs indicative of multiple crop characteristic considerations, such an intercropping characteristic considerations or crop type (e.g., species, genotype, etc.) characteristic considerations, output by multiple crop logic 325.

As indicated by block 640, the one or more criteria can include cut height impact outputs generated by cut height impact logic 326.

As indicated by block 642, the one or more criteria can include various other criteria, such as various other performance criteria, for instance, time to complete, fuel efficiency, wear considerations, etc.

At block 650, control system 204 can generate control signals based on the identified header position setting. As indicated by block 652, control system 204 can generate control signals to control an interface mechanism, such as an operator interface mechanism 202 and/or a user interface mechanism 247, to provide an indication of the identified header position setting, such as in the form of a recommendation to an operator or user to change the position of the header or to provide a notification that the header position setting has been changed based on the identified header position setting. Various other indications can be provided. As indicated by block 652, control system 204 can generate control signals to control a controllable subsystem 208, such as header subsystem 236 to change the header position setting or to control header position actuators 123 to actuate to change a position of the header 108 based on the identified header position setting. Various other control signals can be generated by control system 204 to control various other items of architecture 200, such as other controllable subsystem(s) 208, as indicated by block 656.

At block 660, it is determined if the agricultural harvesting operation at the worksite is complete. If, at block 660, it is determined that the agricultural harvesting operation at the worksite is not complete, processing returns to block 620. If, however, it is determined that the agricultural harvesting operation at the worksite is complete, the operation ends.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 11:
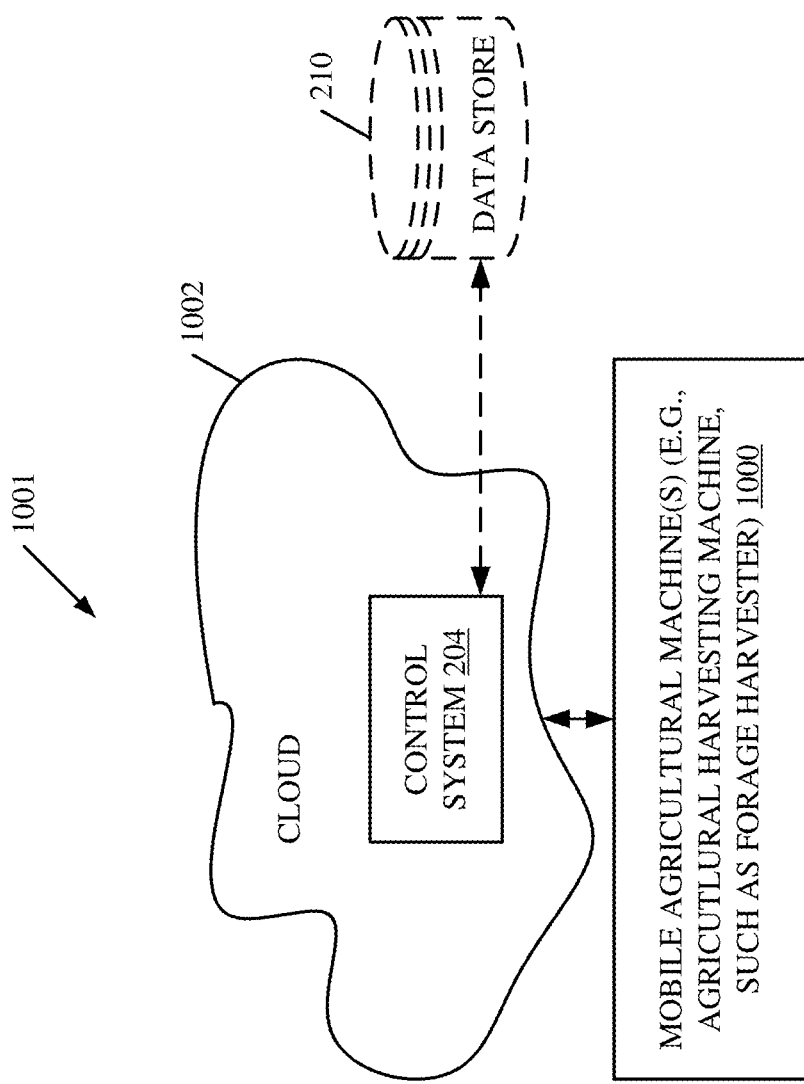
FIG. 11 is a block diagram showing one example of an agricultural harvesting machine in communication with a remote server environment.

FIG. 11 is a block diagram of mobile agricultural machine 1000, which may be similar to mobile agricultural harvester 100 shown in FIG. 2, except that it communicates with elements in a remote server architecture 1001. In an example embodiment, remote server architecture 1000 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 11, some items are similar to those shown in FIG. 2 and they are similarly numbered. FIG. 11 specifically shows that control system 204 (or portions of control system 204) can be located at a remote server location 1002 that is remote from the mobile agricultural machine 1000. Therefore, in the example shown in FIG. 11, harvester 1000 accesses those systems through remote server location 1002. While control system 204 (or portions of control system 204) is depicted in FIG. 11 as being located at a remote server location 1002, it will be understood that additional items can also be located at a remote server location, or, in other example, only some items of control system 204 (e.g., predictive model generator 342, predictive map generator 352, etc.) are located at remote server location 1002 while other items of control system 204 are located on mobile machine 1000. These are just some examples.

FIG. 11 also depicts another embodiment of a remote server architecture. FIG. 11 shows that it is also contemplated that some elements of FIG. 2 are disposed at remote server location 1002 while others are not. By way of example, data store 210 can be disposed at a location separate from location 1002 and accessed via the remote server at location 1002. Regardless of where they are located, they can be accessed directly by harvester 1000, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the mobile agricultural machine 1000 comes close to the fuel truck for fueling, the system automatically collects the information from the mobile agricultural machine 1000 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the mobile machine 1000 until the mobile machine 1000 enters a covered location. The mobile machine 1000, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
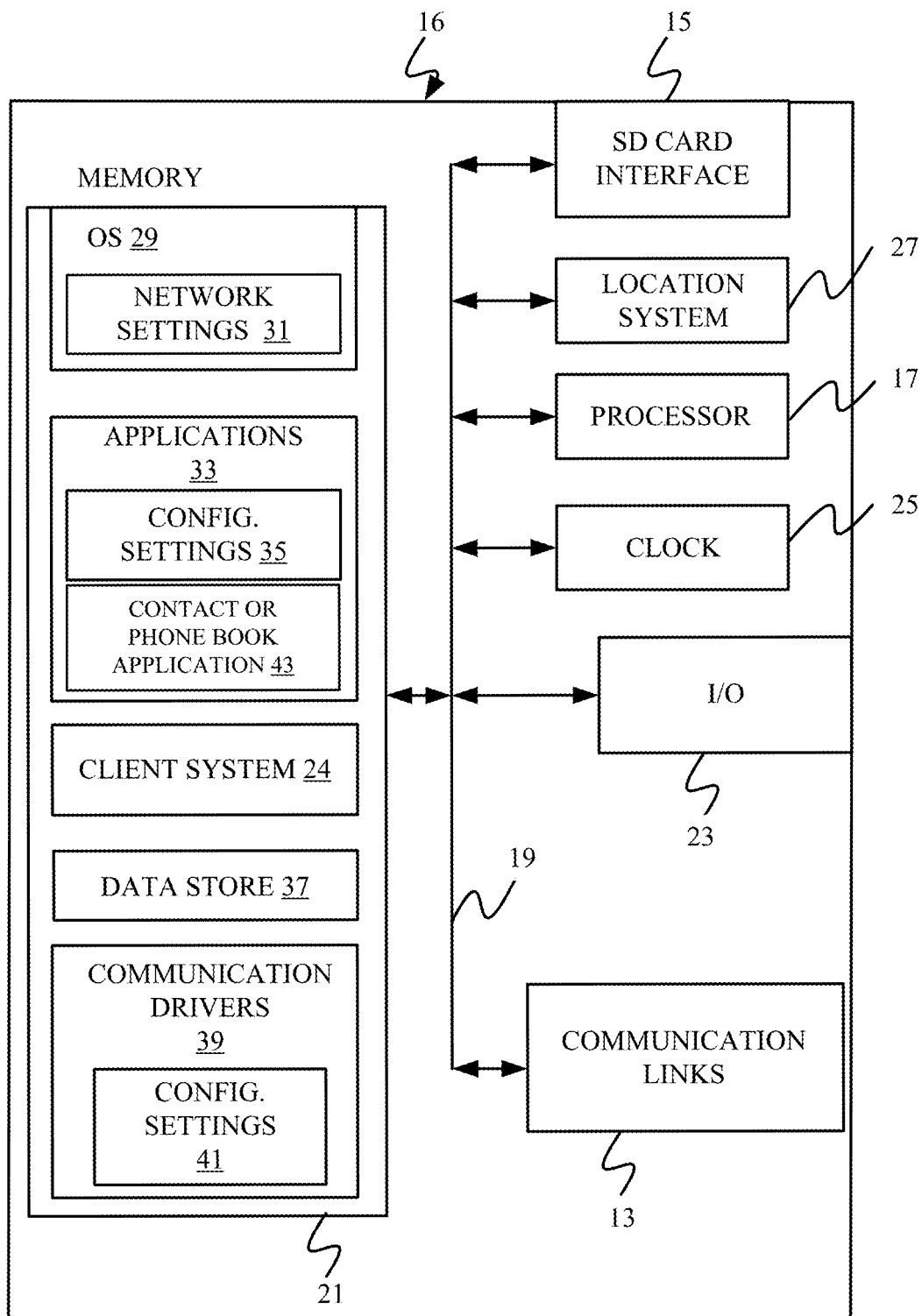
FIG. 12-14 show examples of mobile devices that can be used in an agricultural harvesting machine.
Figure 13:
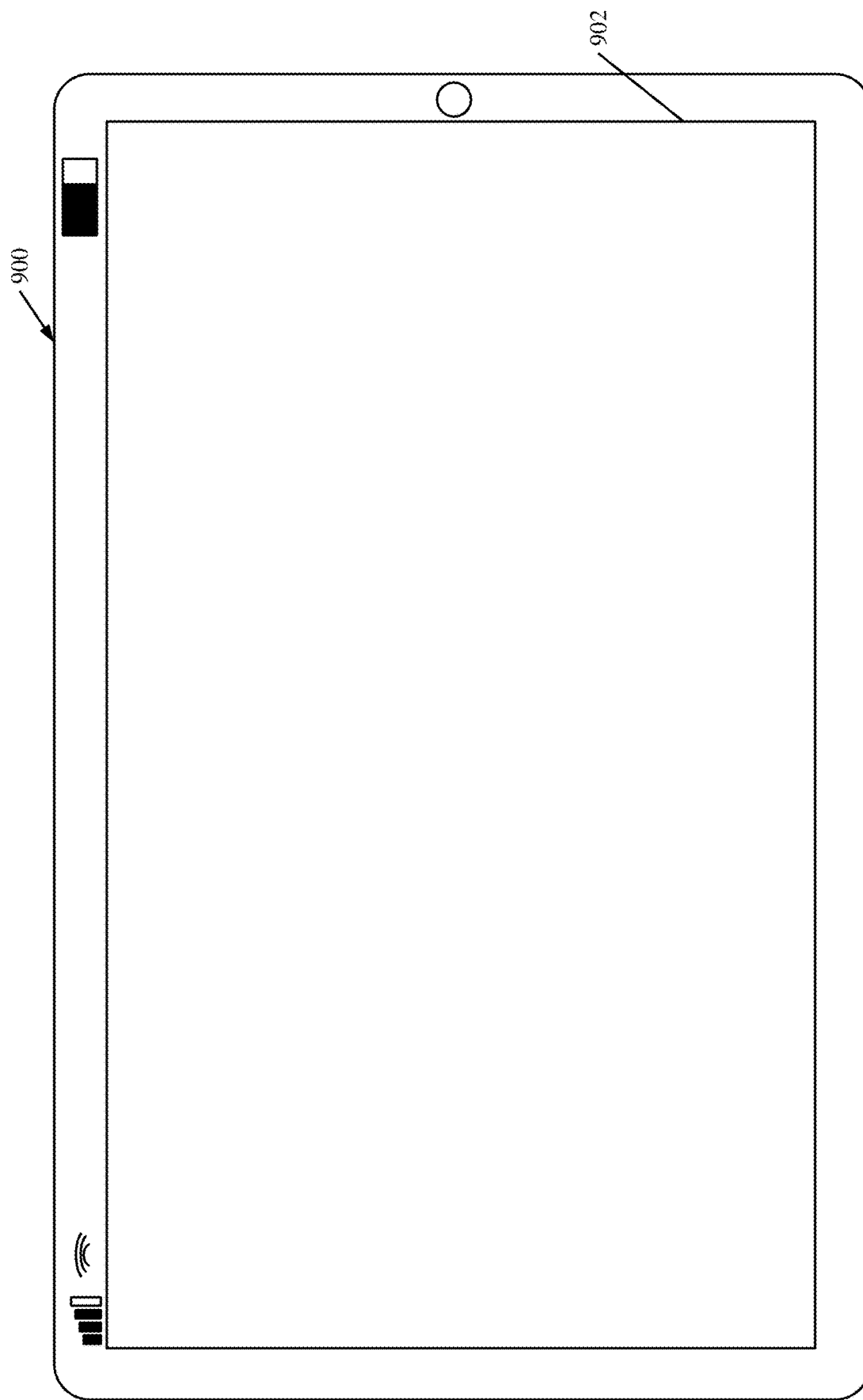
Figure 14:
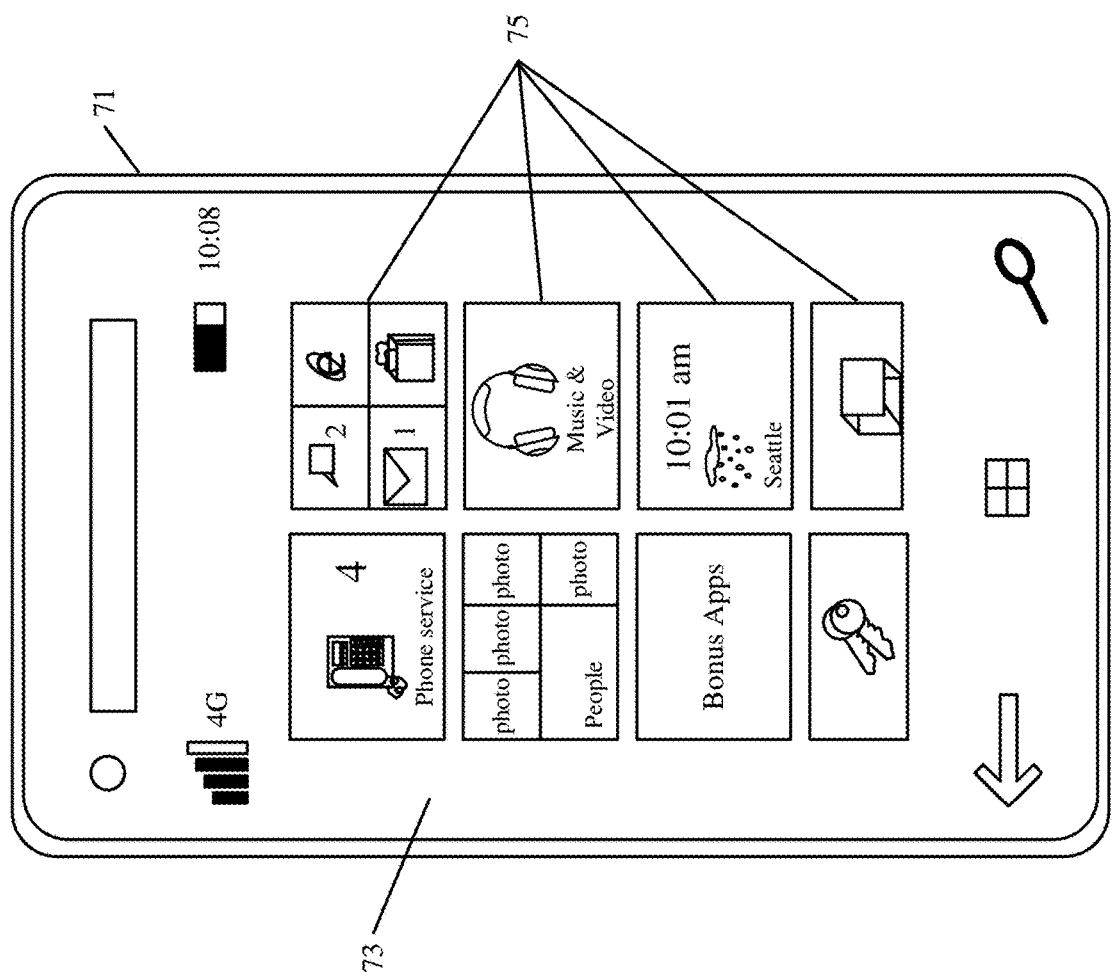

FIG. 12 is a simplified block diagram of one illustrative embodiment of a handheld or mobile computing device that can be used as a user's or client's handheld device 16, in which the present system (or parts of it) can be deployed. For instance, a mobile device can be deployed in the operator compartment of mobile agricultural machine 100 for use in generating, processing, or displaying the crop constituent values, the maps discussed above, header position settings, as well as various other items. FIGS. 13-14 are examples of handheld or mobile devices.

FIG. 12 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 (which can also embody processor 211, processor 216, or processor 213) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one embodiment in which device 16 is a tablet computer 900. In FIG. 13, computer 900 is shown with user interface display screen 902. Screen 902 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 900 can also illustratively receive voice inputs as well.

FIG. 14 shows one embodiment in which device 16 is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

It will be noted that other forms of the devices 16 are possible.

Figure 15:
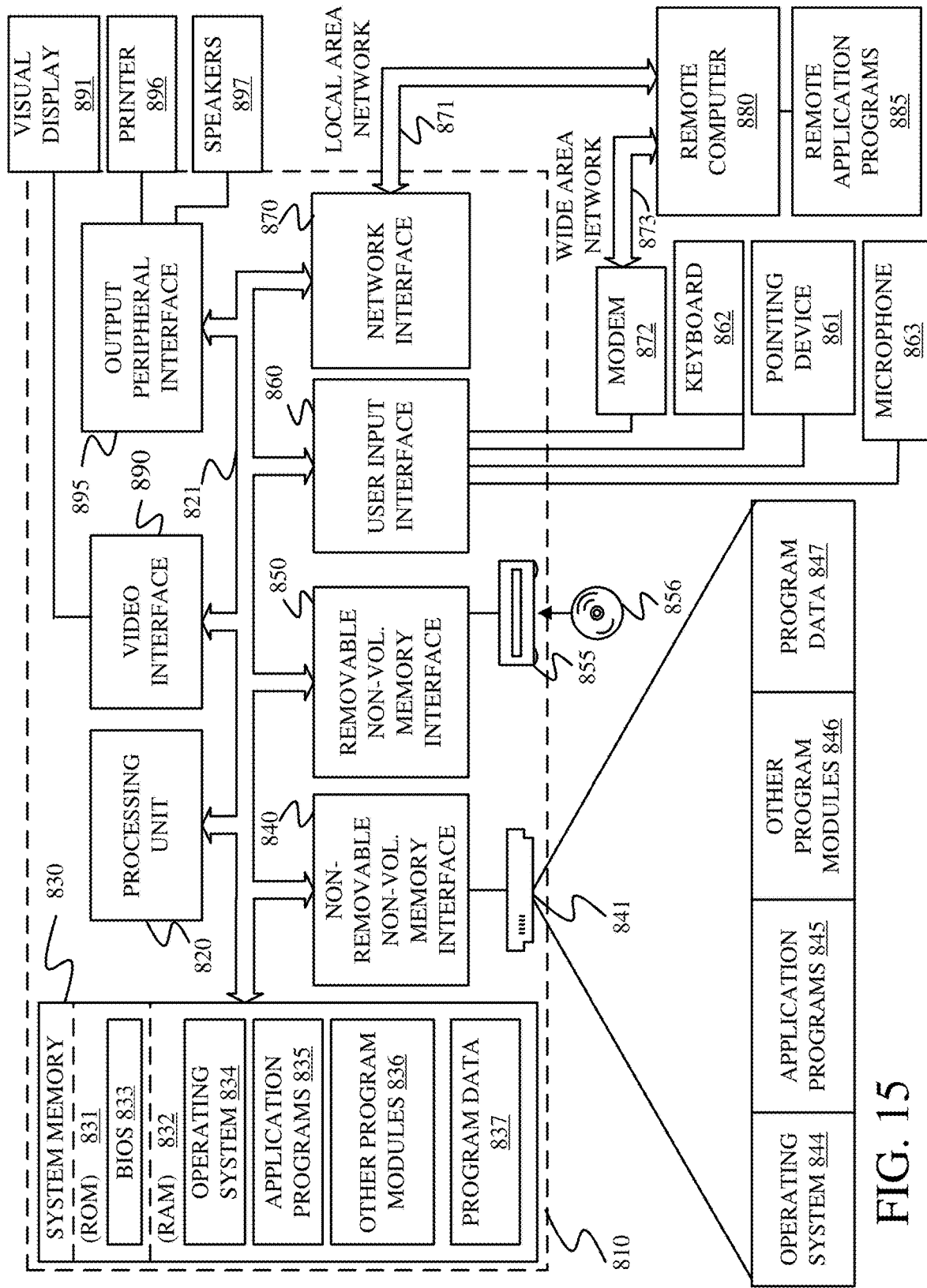
FIG. 15 is a block diagram showing one example of a computing environment that can be used in an agricultural harvesting machine.

FIG. 15 is one embodiment of a computing environment in which elements of FIG. 2, or parts of it, (for example) can be deployed. With reference to FIG. 15, an exemplary system for implementing some embodiments includes a general-purpose computing device in the form of a computer 810. Components of computer 810 may include, but are not limited to, a processing unit 820 (which can comprise one or more of processor(s)/controller(s)/server(s) 211, processor(s) controller(s)/server(s) 213, and processor(s) controller(s)/server(s) 216), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, a magnetic disk drive 851, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 15 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile agricultural machine comprising:
   a header configured to engage crop at a worksite;
   a controllable header actuator configured to drive movement of the header relative to a surface of the worksite;
   a crop constituent sensor system configured to sense the crop and generate a crop constituent sensor signal indicative of a starch value of the crop; and
   a control system configured to:
      compare the starch value of the crop to a target starch value; and
      based on the comparison, generate a control signal to control the controllable header actuator to drive movement of the header relative to the surface of the worksite.

2. The mobile agricultural machine of claim 1, wherein the control system is further configured to:
   generate the control signal based further on a header position limit.

3. The mobile agricultural machine of claim 1, wherein the control system is further configured to:
   identify a direction in which to drive movement of the header based on the comparison; and
   generate the control signal to control the header actuator to drive movement of the header in the identified direction within a header position threshold range.

4. The mobile agricultural machine of claim 1, wherein the control system is further configured to:
   determine that the detected starch value satisfies the target starch value based on the comparison;
   determine that a current height of the header is above a minimum header height threshold and;
   generate the control signal to control the header actuator to lower the header relative to the surface of the worksite to a height at or above the minimum header height threshold.

5. The mobile agricultural machine of claim 1, wherein the control system is further configured to:
   determine that the detected starch value is below the target starch value based on the comparison;
   determine that a current height of the header is below a maximum header height threshold; and
   generate the control signal to control the header actuator to raise the header relative to the surface of the worksite to a height at or below the maximum header height threshold.

6. The mobile agricultural machine of claim 1, wherein the crop is corn silage, wherein the constituent sensor signal is indicative of a starch value of the corn silage, and wherein the control system is further configured to:
   determine that the detected starch value is below the target starch value based on the comparison and generate the control signal to control the header actuator to raise the header relative to the surface of the worksite.

7. A method of controlling a mobile agricultural machine comprising:
   detecting crop material harvested by the mobile agricultural machine;
   generating a crop constituent signal indicative of a starch value-of a constituent of the detected crop material;
   identifying the starch value of the crop material based on the crop constituent sensor signal; and
   comparing the identified starch value to a target starch value; and
   generating, based on the comparison, a control signal to drive movement of a header of the mobile agricultural machine.

8. The method of claim 7, wherein generating the control signal to drive movement of the header of the mobile agricultural machine comprises:
   generating the control signal to drive movement of the header of the mobile agricultural machine within a header position limit.

9. The method of claim 7 and further comprising:
   determining that the identified starch value of the crop material satisfies the target starch value based on the comparison;
   determining that a current height of a header of the mobile agricultural machine is above a minimum header height threshold; and
   generating the control signal to lower the header of the mobile agricultural to a height at or above the minimum header height threshold.

10. The method of claim 7 and further comprising:
    determining that the identified starch value of the crop material is less than the target starch value based on the comparison;
    determining that a current height of a header of the mobile agricultural machine is below a maximum header height threshold; and
    generating the control signal to raise the header of the mobile agricultural machine to a height at or below the maximum header height threshold.

11. The method of claim 7 and further comprising:
    determining that the identified starch value of the crop material is less than the target starch value based on the comparison; and
    generating the control signal to raise the header of the mobile agricultural machine relative to a surface of a worksite at which the mobile agricultural machine is operating.

12. The method of claim 7 and further comprising:
    determining that the identified starch value of the crop material satisfies the target starch value based on the comparison; and
    generating the control signal to lower the header of the mobile agricultural machine relative to a surface of a worksite at which the mobile agricultural machine is operating.

13. A self-propelled agricultural harvesting machine, comprising:
- a power source;
- a frame;
- a set of ground engaging elements configured to be driven by the power source to propel the agricultural harvesting machine over a surface of a worksite;
- a header, movably coupled to the frame, configured to engage crop and cut the crop for processing by the agricultural harvesting machine;
- a header position actuator configured to drive movement of the header to different positions relative to the surface of the worksite;
- a crop constituent sensor system configured to sense the processed crop and generate a sensor signal indicative of a starch value of the processed crop;
- a control system configured to:
  - identify the starch value of the processed crop based on the sensor signal;
  - compare the identified starch value of the processed crop to a target starch value; and
  - generate a control signal to cause actuation of the header position actuator to drive movement of the header relative to the surface of the worksite based on the comparison.

14. The self-propelled agricultural harvesting machine of claim 13, wherein the control system generates the control signal to cause actuation of the header position actuator to drive movement of the header to a height, relative to the surface of the worksite, within a header height limit based on the comparison.

* * * * *